United States Patent
Kato et al.

(10) Patent No.: US 7,856,492 B2
(45) Date of Patent: Dec. 21, 2010

(54) METHODS AND SYSTEMS FOR MANAGING MEDIA CONTENT

(75) Inventors: Hiroki Kato, Kanagawa (JP); Yoshiharu Dewa, Tokyo (JP); Hirotoshi Maegawa, Tokyo (JP)

(73) Assignee: SONY Corporation, Tokyo (JP)

( * ) Notice: Subject to any disclaimer, the term of this patent is extended or adjusted under 35 U.S.C. 154(b) by 1469 days.

(21) Appl. No.: 10/514,389

(22) PCT Filed: May 15, 2003

(86) PCT No.: PCT/JP03/06060

§ 371 (c)(1),
(2), (4) Date: Nov. 15, 2004

(87) PCT Pub. No.: WO03/098473

PCT Pub. Date: Nov. 27, 2003

(65) Prior Publication Data

US 2005/0198044 A1    Sep. 8, 2005

(30) Foreign Application Priority Data

May 16, 2002  (JP)  ............................ 2002-141554

(51) Int. Cl.
    *G06F 15/173*  (2006.01)
(52) U.S. Cl. ...................................... 709/223; 707/803
(58) Field of Classification Search ................. 709/225, 709/232, 223; 707/100, 803
    See application file for complete search history.

(56) References Cited

U.S. PATENT DOCUMENTS 5,615,372 A * 3/1997 Nishina ....................... 713/100
5,841,988 A * 11/1998 Chennubhotla et al. ..... 709/237
6,133,912 A   10/2000 Montero (Continued)

FOREIGN PATENT DOCUMENTS

JP    11-296461    10/1999

(Continued)

OTHER PUBLICATIONS

Yasuyuki Tsuno, Kaoru Tsuno, Kenji Mase, "Deai o Shien suru Agent", bit, Kyoritsu Shuppan Co., Ltd., Jun. 1, 1999, vol. 31, No. 6, pp. 69 to 79.

(Continued)

*Primary Examiner*—Saleh Najjar
*Assistant Examiner*—Marie Georges Henry
(74) *Attorney, Agent, or Firm*—Finnegan, Henderson, Farabow, Garrett & Dunner LLP

(57) ABSTRACT

An information processing device is capable of handling changes occurring in values of information possessed by targets. Relationships between information are expressed as relationship structures through connection in a hierarchical manner using links expressing topic nodes expressing content of information as reference information. The relationship structures are generated for each provider providing information and generate an overall relationship structure for all of the information. A weighting is assigned to links so that values can be calculated for the topic nodes using just the weightings of nodes linking to topic nodes. These values are such that in a case where user information is utilized, topic node values relating to this information are added. It is therefore possible to know the value of information with respect to a user using these topic nodes.

33 Claims, 26 Drawing Sheets

U.S. PATENT DOCUMENTS

| | | | | |
|---|---|---|---|---|
| 6,154,213 | A | * | 11/2000 | Rennison et al. ............. 715/854 |
| 6,163,843 | A | * | 12/2000 | Inoue et al. .................... 726/11 |
| 6,848,003 | B1 | * | 1/2005 | Arimilli et al. .............. 709/232 |
| 2004/0030800 | A1 | * | 2/2004 | Gray et al. ................... 709/238 |
| 2006/0206838 | A1 | * | 9/2006 | Gottfurcht et al. ........... 715/854 |

FOREIGN PATENT DOCUMENTS

| | | |
|---|---|---|
| JP | 2001-034625 | 2/2001 |
| JP | 2001-155038 | 6/2001 |
| KR | 10-2001-0043337 A | 5/2001 |
| WO | WO 00/77690 | 12/2000 |
| WO | WO 01/79964 | 10/2001 |

OTHER PUBLICATIONS

Shunsuke Saruwatari, "Peer to Peer Network o Mochiita User no Kyomi ni Motozuku Contents Denpa Kiko", 2002 Nen The Institute of Electronics, Information and Communication Engineer Sogo Taikai Koen Ronbunshu (Communication-2), Mar. 7, 2002, p. 160.

Kaoru Tsuno et al., "Kojin no Gainen Kukan o Riyo shita Kyomi no Suitei ni yoru Joho Teikyo", The Transactions of the Institute of Electronics, Information and Communication Engineers (D-II), Oct. 25, 1999, vol. J82-D-II, No. 10, pp. 1634 to 1644.

Hiroyuki Sato, Kenji Otomo, Tsuyoshi Masuo, "Chishiki Ryutsu o Jitsugen suru Contents Clipping no User Interface", Information Processing Society of Japan Dai 63 Kai (Heisei 13 Nen Koki) Zenkoku Taikai Koen Ronbunshu (3), Sep. 26, 2001, pp. 51 to 52.

Hiroyuki Sato, Kenji Otomo, Tsuyoshi Masuo, "XML o Riyo shita Chishiki Ryutsu System no Architecture", Information Processing Society of Japan Kenkyu Hokoku (2001-GW-39), Mar. 22, 2001, vol. 2001, No. 32, pp. 71 to 76.

Toru Takeuchi et al., "User no Kanrensei ni Motozuita Joho Denpa Model", Dai 12 Kai Data Kogaku Work Shop (DEWS2001), The Institute of Electronics, Information and Communication Engineers, Mar. 8, 2001, pp. 1 to 8.

Tom Takeuchi et al., "User no Kanrensei o Mochiita Joho Denpa Model no Hyoka Jikken", Natsu no Data-base Work Shop (DBWS2001), Information Processing Society of Japan, Jul. 17, 2001, pp. 1 to 8.

Communication from European Patent Office dated Sep. 25, 2007 in counterpart application No. EP 03 72 5781 (3 pages).

Ohsawa, Yukio, et al., "KeyGraph: Automatic Indexing by Co-occurrence Graph based on Building Construction Metaphor,"Dept. Systems and Human Science, Graduate School of Engineering Science, Osaka University, Toyonaka, Osaka 560-8531, Japan (1998) 7 pages.

Pirolli, Peter, et al., "Silk from a Sow's Ear: Extracting Usable Structures from the Web," Xerox Palo Alto Research Center, Palo Alto, CA 94304,submitted to the Conference on Human Factors in Computing Systems, CHI-96, (1996) 9 pages.

Takeuchi, Susumu et al., "Human-Network-based Filtering: the Information Propagation Model based on Word-of-Mouth Communication," Proceedings of the 2003 Symposium on Applications and the Internet, IEEE Computer Society (2003) (8 pages).

Takeuchi, Susumu et al., "Evaluation of the Information-Spread Model based on Users' Relevance," The Institute of Electronics Information and Communication Engineers, Technical Report of IEICE (Jul. 2001) (8 pages).

Office Action in counterpart Korean Application No. 10-2004-7018433 dated Feb. 23, 2010 (4 pages) with English language translation thereof (5 pages).

* cited by examiner

```
<topic id="photo">
 <Name>写真</Name>
 <effect>0</effect>
</topic>

<topic id ="winter_mountain">
 <Name> 冬山</Name>
 <occurrence>
  <instanceOf>image</instanceOf>
  <scope>local</scope>
  <resourceRef xlink:href="file://image.jpg" />
 </occurence>
 <effect val="0"/>
</topic>

<topic id ="komagatake">
 <Name> 駒ケ岳</Name>
 <occurrence>
  <instanceOf>image<instanceOf>
  <scope>local</scope>
  <resourceRef xlink:href="file://image.jpg" />
 </occurence>
 <effect val="0"/>
</topic>

<association id="pic-mountain">
 <instanceOf xlink:href="#superclass-subclass">
  <weight val="1.0"/>
  <member>
   <roleSpec>
    <topicRef xlink:href="#super"/>
   </rolseSpec>
   <topicRef xlink:href="#photo"/>
  </member>
  <member>
   <roleSpec>
    <topicRef xlink:href="#sub"/>
   </rolseSpec>
   <topicRef xlink:href="#winter-mountain"/>
  </member>
</association>
<association id="pic-komagatake">
 <instanceOf xlink:href="#superclass-subclass">
 <weight val="1.0"/>
 <member>
  <roleSpec>
   <topicRef xlink:href="#super"/>
  </rolseSpec>
  <topicRef xlink:href="photo"/>
 </member>
 <member>
  <roleSpec>
   <topicRef xlink:href="#sub"/>
  </rolseSpec>
  <topicRef xlink:href="#komagatake"/>
 </member>
</association>
```

Fig. 6

METHODS AND SYSTEMS FOR MANAGING MEDIA CONTENT

TECHNICAL FIELD

The present invention relates to an information management system, information processing device, information processing method, information processing program, and storage medium. Specifically, changes occurring in information value are handled by generating an information relationship structure for between information.

BACKGROUND ART

In a networked society where value systems are becoming ever more diversified, it is difficult to express a value of information flowing over a network in a uniform manner. For example, in a case of photographs of your own children, a value of the photographs changes in a case of showing the photographs to friends and in a case of showing the photographs to the children's grandparents. The value therefore changes according to a context (with whom the information is being communicated) even for the same information.

In the high-speed network society, it is considered that individual users or a community accumulates this kind of information and values.

Technology capable of expressing this kind of accumulated information and values as a user community profile, and handling changes in the profile due to the advancement of communication activities becomes extremely important.

By handling these kinds of profiles, it is possible for the user to understand their own experiences in accordance with relationship with targets over a network.

Further, understanding of information by analyzing based on past relationships while searching new information is straightforward. Further, appropriate information distribution based on the experience of a user himself/herself is also possible without publishing individual information of the user. A company may also understand relationships between users over a network and understand a value of its own products in the community.

In related arts, technology paying attention to relationships with targets of communication is disclosed in Japanese Laid-open Patent Application Publication No. Hei. 11-296461 "System and Method for Exchanging Information Between Users, User Terminal, Server Calculator, and Recording Medium Recorded With Inter-user Information Exchange Program".

In this invention, support of communication activities is carried out by describing user characteristics using multi-dimensional vectors, calculating relevance between users from the multi-dimensional vectors and expressing these on a terminal, and presenting the relationship that the users have.

This invention handles similarity of preferences but does not take into consideration what kind of value is provided due to communication with a subject of a certain relationship. Because of this, with the previous example of a photograph, friends and relatives are handled as targets having the same similarity of preferences.

In addition to user preferences, technology taking into consideration influence is provided in Japanese Patent Application Publication No. 2001-34625, "Document Information Providing Method, Document Information Providing Device, and Storage Medium Recorded With Document Information Providing Program".

This invention is capable of giving a high value according to the topic of information recommended by users who tend to recommend information of a certain value by expressing the dependency in user profiles that people make recommendations to other people for items that they themselves like.

Further, technology taking into consideration relationships between users is described in "Information-Spread Model based on Users Relevance" (12th Data Engineering Workshop (DEWS2001) and "the Distributed Information Collection System By Word-Of-Mouth" (10th Workshop on Multiagent and Cooperative Computation).

In this technology, information is filtered and information of value is propagated by individual users being in possession of reliability with respect to neighboring users for between neighboring users on a network, with information distribution then being carried out based on this reliability. The inventions and technologies described above express relationships as profiles in order to promote flowing of only information having a value.

Further, an invention expressing user preferences in order to enable recommendations according to context for a user is provided in Japanese Patent Application Publication 2001-155038 "User Preference Information Structure having a Poly-hierarchal Structure and Multimedia Information Providing Method Utilizing this Structure". This invention enables the expression of a degree of preference for information at home and a degree of preference for information at an office etc. using technology for user profiles having a hierarchical structure.

This invention enables the expression of user profiles for each device by cutting out part of a hierarchical structure etc. For example, it is possible to carry out a description of "when a user is viewing a movie using a television in a living room, a movie that can be watched by the family together is preferred, but when the user is watching a movie using a television in his/her own room, there are cases where a more adult-oriented movie may be preferred". This may be referred to as a profile expressing the relationship between devices and users.

However, these inventions and technologies to not take into consideration the expression of what kind of value is collected together at targets centered on in sets for relationships. Namely, communications occurring at certain relationships mutually influence each other and it is not possible to handle changes in value possessed by information occurring as a result.

The object of the present invention is to provide an information processing device etc. capable of dynamically handling changes occurring in value of information.

DISCLOSURE OF THE INVENTION

In order to achieve the aforementioned object, the present invention provides an information management system relating to exchanging of information carried out between a plurality of terminals via a network, wherein the terminals comprise: transmitting and receiving means for transmitting and receiving information via the network from other terminals; specifying means for specifying transmission and reception targets for information transmitted and received; and relationship structure generating means for, with respect to the transmitted and received information, generating relationship structures for between information possessed by the terminals for topic nodes correlated to content of the information and resource nodes specifying information resources for the information by setting links expressing relationships referencing between topic nodes or between topic nodes and resource nodes for every specific transmission and reception target.

The relationship structure generating means is capable of updating relationship structures for transmission and reception targets constituting transmission sources of the information using the meta-information in a case where meta-information for setting topic nodes and links is attached to information received by the transmitting and receiving means.

The terminals can be equipped with meta-information generating means for generating meta-information for setting topic nodes relating to prescribed information and reference relationships using the relationship structures. The terminals may also be configured so that in a case where any terminal transmits information to another terminal, meta-information relating to the information is generated by the meta-information generating means, and the generated information is attached to the information and transmitted to the another terminal.

Value assigning means for assigning values to the topic nodes, changing means for changing values assigned to the topic nodes correlated to the information by the links according to utilization conditions in a case where the information is utilized, and value acquisition means for acquiring values of the topic nodes changed by the changing means may also be provided at the terminals.

In order to achieve the above object, the present invention also provides an information processing device equipped with storage means for storing, with regards to topic nodes correlated to content of information and resource nodes specifying information resources for information, relationship structures for between the information expressed by setting links expressing reference relationships between topic nodes or between topic nodes and resource nodes, wherein the relationship structure comprises specific relationship structures generated for each transmission and receiving target of the information, and overall relationship structures generated for all the information (first configuration).

Transmitting and receiving means for transmitting and receiving information via a network, specifying means for specifying transmission and reception targets for the information using the transmitting and receiving means, and updating means for, with respect to the specific relationship structures for the specified transmitting and receiving targets and the overall relationship structures, updating the relationship structures by adding topic nodes and resource nodes relating to information transmitted and received by the transmitting and receiving means and setting links for added topic nodes and resource nodes may also be provided in the first configuration (second configuration).

A configuration can be adopted with regards to the second configuration where, in a case of meta-information relating to the information content being attached to information received by the transmitting and receiving means, generation of the topic nodes and setting of the links is carried out using the meta-information.

In the first configuration, information relating to a transmission and reception targets constituting transmission sources of information resources specified by the resource nodes is made to correlate to the resource nodes.

Further, in the second configuration, the configuration is such that, in a case where information received by the transmitting and receiving means contains reference information specifying a reference destination for information resources, information specifying a transmission and reception target constituting a transmission source of the information and information specifying a transmission and reception target constituting a reference destination for the reference information is made to correlate.

In the second configuration, it is possible to acquire requests for information transmission, and when an information transmission request is received, it is possible to transmit the requested information.

It is also possible to configure the second configuration so that, in the event of information transmission, meta-information is generated using at least one of specific relationship structures relating to this information or overall relationship structures, with this meta-information being attached to information for transmission.

Further, in the first configuration, a configuration can be adopted where values are assigned to topic nodes, with the values then being made to change according to utilization conditions for the information. Topic node values then reflect information utilization conditions.

As a method of assigning values to topic nodes, it is possible to assign weightings to links set at topic nodes, and then to decide values for topic nodes by appropriately calculating these weightings. It is preferable to change weightings of nodes in cases where values of topic nodes are changed. More specifically, it is possible to propagate changes in weightings of links by repeating a process of increasing weightings of links between resource nodes corresponding to utilized information and topic nodes referenced to by the resource nodes and increasing weightings of links between the topic nodes and other topic nodes set with links a prescribed number of times.

Further, a configuration can be adopted where settings for links with weightings that are less than a prescribed threshold value are cancelled. A configuration is also possible where topic nodes for which links are no longer set as a result of canceling of links can be deleted.

Further, in a case where received information contains reference information specifying a reference destination for information resources, and accesses are carried out to the information resources using the reference information, specific relationship structures are generated with reference destinations constituting places of procurement for the information resources.

Further, when values for the topic nodes satisfy prescribed conditions, preset information processing is executed at the topic nodes.

Moreover, in the second configuration, the information is incorporated into the received information based on the conditions in a case where conditions for incorporating the information correlated at prescribed topic nodes into the received information is contained in received information received by the transmitting and receiving means, and the received information and the information is presented using received information for which incorporation of the information by the incorporation means is complete.

Further, a configuration for visualizing and displaying the specific relationship structures using a prescribed procedure is possible.

For example, similarity acquisition means for acquiring similarities between the specific relationship structures and the overall relationship structures, and structure value acquisition means for acquiring structure values for the specific relationship structures based on values of topic nodes within the specific relationship structures may be provided, with the display means then arranging and displaying the specific relationship structures in space taking structure values and similarity of specific relationship structures as coordinate axes using the acquired similarities and the acquired structure values.

Further, the display means can display topic nodes arranged in space taking topic node utilization frequency and topic node values as coordinate axes.

Moreover, it is possible to provide, with respect to information provided with a relationship structure containing sets of information describing relationship structures for information content beforehand using topic nodes set with links, similarity relationship structure acquisition means for acquiring, from the specific relationship structures, items that are most similar to relationship structures for information provided with the relationship structures, structure value acquisition means for acquiring structure values for the acquired specific relationship structures based on values of topic nodes within the acquired specific relationship structures, and similarity acquisition means for acquiring similarities between the information provided with the relationship structures and the overall relationship structures, with the display means then displaying information provided with relationship structures contained in the sets in space taking structure values and similarity of specific relationship structures as coordinate axes using the acquired structure values and the acquired similarities.

Moreover, it is also possible to provide, with respect to information provided with relationship structures contained in sets of information attached with a plurality of preset relationship structures, extracting means for matching each relationship structure attached to information provided with the relationship structures and the specific relationship structures and extracting specific relationship structures having the same structure, similarity acquisition means for acquiring similarities between the extracted specific relationship structures and the overall relationship structures, and structure value acquisition means for acquiring structure values of the extracted specific relationship structures, with the display means then displays information provided with relationship structures contained in the sets in space taking structure values and similarity of relationship structures as coordinate axes using the acquired similarities and the acquired structure values.

In addition, at the display means, it is possible to choose relationship structures for each providing source utilized in the displaying of the information.

BRIEF DESCRIPTION OF THE DRAWINGS

FIG. 6 is a view showing an example of meta-information.

BEST MODE FOR CARRYING OUT THE INVENTION

The following is a description of details of a preferred embodiment of the present invention.

(1) Outline of the Embodiment

The relationship between information for information possessed by a certain user is expressed using a relationship model. A relationship model is a model where topic nodes expressing content of information are linked in a hierarchical manner using links expressing reference relationships. A relationship model is generated for each provider providing information and generates an overall relationship structure for all of the information.

A link to a resource node holding information specifying information resources etc. is set at a lowermost topic node. In this embodiment, topic nodes are correlated in a hierarchical manner but the present invention is by no means limited in this respect, and other forms of correlation are also possible.

A weighting is assigned to this link so that a value can be calculated for each topic node using just the weightings of nodes linking to topic nodes. This value is such that when user information is utilized, a value for a topic node relating to this information is added. It can therefore be known what information is of a high value to a user and what information provider is of a high value by using the topic nodes.

For example, in a case where a user utilizes certain information, as in displaying image data, playing back music data, or sending certain data to other users, the value of this information and the value of the provider of this information are increased. Change in value can be dynamically understood using a relationship model.

As a result, a profile for a target can be understood by using a relationship model expressing a relationship with a specific information provider and a relationship model for all of the information, and the structure of these can then be dynamically changed from communication activity occurring between these relationships.

Communication activity is viewed as starting from when value is first generated as a result of using the information, and changes in value of information possessed by the user or information provided by the user can then be handled through communication occurring for the relationships.

(2) Details of the Embodiment

Figure 1:
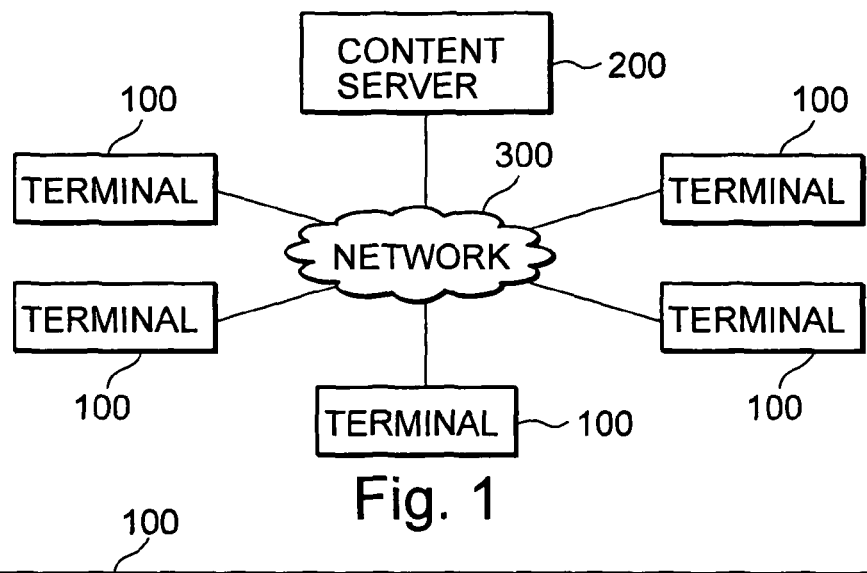
FIG. 1 is a view showing an example of a network configuration of an embodiment.

FIG. 1 is a view showing an example of a network configuration of the embodiment. As shown in the drawings, in the embodiment, a content server 200 and terminals 100, 100, 100, . . . , are provided so as to be connectable over a network 300. Only five terminals 100 are shown in the drawings but it is possible for an arbitrary number of terminals 100 to be connected over a network 300.

The content server 200 is capable of sending various content such as music content and movie content etc. to the terminals 100 via the network 300.

In addition to being capable of exchanging information with the content server 200 via the network 300, the terminals 100 are capable of exchanging information between terminals 100 via a mail server (not shown) etc.

For example, a user A may send image data to a user B, and the user B may further transfer this to a user C.

The terminal 100 is configured with a personal computer having communication functions using the network 300, for example, but may also be a network-connectable game, portable terminal, or STP (Set Top Box) etc.

The network 300 may also intermediate the exchange of data using a protocol for, for example, the Internet, such as TCP/IP (Transmission Control Protocol/Internet Protocol).

In addition to the Internet, for example, a LAN (Local Area Network), WAN (Wide Area Network), optical cable network, or satellite communication network etc. may also be used as the network 300.

Figure 2:
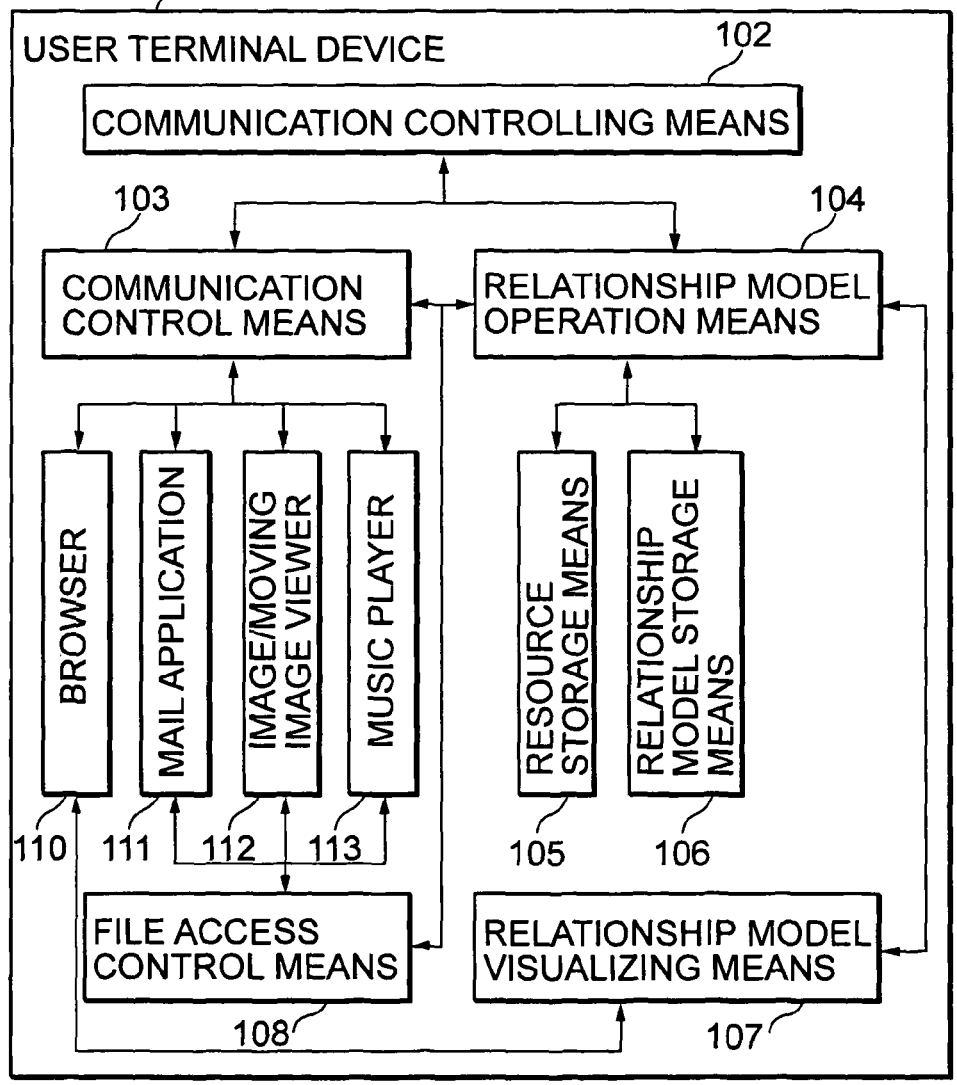
FIG. 2 is a view showing an example of a functional configuration for a terminal.

FIG. 2 is a view showing an example of a functional configuration for the terminal 100. The terminals 100 are equipped with communication control means 102, communicating control means 103, relationship model operation means 104, resource storage means 105, relationship model storage means 106, relationship model visualizing means 107, file access control means 108, a browser 110, a mail application 111, an image/moving image viewer 112, and a music player 113, etc.

The terminals 100 are equipped with CPUs (Central Processing Unit) for carrying out various arithmetic processing in accordance with prescribed programs, a read/writable RAM (Random Access Memory) constituting a storage medium providing a working area for the CPU to carry out arithmetic processing for temporarily storing various data, a ROM (Read Only Memory) for storing in a manner only enabling reading programs etc. for causing the terminals 100 to function, and a storage device etc. for storing various programs and data constituted by a hard disc etc.

Each of the structural elements shown in FIG. 2 are configured as software-based results of executing an information processing program stored on a hard disc etc. using a CPU.

Further, it is possible to configure part or all of each of the configurational elements from hardware as dedicated devices, etc.

The communication control means 102 controls the transmission and reception of data by the terminals 100 to the content server 200 and other WEB servers and main servers etc via the network 300. In this case, the communication control means 102 constitutes information acquisition means and information transmission means.

The communicating control means 103 monitors the transmission and reception of data on the network 300 via the communication control means 102. The transmission and reception of data may be through downloading of content using the browser 110 or through transmission and reception of an electronic mail using the mail application 111.

The browser 110 is a WWW browser for extracting information from files etc. downloaded from the content server 200, with this information then being utilized by a user.

For example, the browser 110 is capable of displaying WEB pages defined using a prescribed language such as HTML (Hypertext Markup Language) at a display of a terminal 100.

Further, it is possible to access sites defined by a URL by inputting URLs (Uniform Resource Locators) from the browser 110.

Moreover, when a URL is embedded in a WEB page, it is possible to jump to a site specified by the URL by selecting this URL through clicking, etc.

The mail application 111 carries out transmission and reception of electronic mails. An electronic mail may be transmitted and received with various information such as image data files, moving image data, audio data and text files etc. attached.

It is also possible, for example, to transmit an e-mail without attaching information directly to the e-mail but rather attaching reference information such as a URL.

When an electronic mail is transmitted, a destination mail address is inputted to the mail application 111 and a destination is specified.

The image/moving image viewer 112 plays back and displays on a display image data of various formats such as, for example, a bitmap format, and a JPEG format etc. and moving picture data of various formats such as an MPEG format and an AVI format, etc. Further, playback of audio data takes place in a case where audio data is included in the moving image data.

The music player 113 plays back audio data of various formats such as, for example, a WAV format and an MP3 format, etc.

The file access control means 108 monitors utilization of resources by the browser 110, the mail application 111, the image/moving image viewer 112 and the music player 113, etc. As described in the following, in this embodiment, the value of the resource is calculated based on the degree of utilization by a user. Because of this, at the file access control means 108, it is possible to decide the value of the respective resources by understanding the extent to which resource has been utilized.

Here, resources refer to information resources that are capable of being utilized. Meta-information described in the following is information attached to resources indicating the content of the resources. Further, there are also cases where a resource is information (for example, a URL) relating to locations where utilizable information exists.

The relationship model operation means 104 updates relationship models (described later) based on monitoring information from the file access control means 108, and carries out processing relating to relationship models such as storing updated relationship models in the relationship model storage means 106.

As described later, relationship models consist of specific relationship models (specific relationship structures) generated for each party to which information is transmitted to and received from, and an overall relationship model (overall relationship structure) generated for all information taken as an operating target by the terminal 100. In the case of transmitting and receiving information, the relationship model operation means 104 updates specific relationship models for the targets of transmission and reception, and updates the overall relationship models.

The relationship model storage means 106 is storage means for storing specific relationship models and overall relationship models.

Further, in a case where a specific relationship model does not exist for the source and destination of the information, this is generated anew.

The relationship model operation means 104 is configured from relationship structure generating means for generating relationship models (relationship structures) and updating means for updating the relationship models.

The resource storage means 105 stores resources such as image data and audio data etc. Further, there are also cases where data stored is not an actual resource but is reference information (URL etc.) for a resource stored on an external server, etc. In this case, a reference resource constituting a virtual resource holding reference information for the resource is generated and stored in the resource storage means 105.

The relationship model visualizing means 107 then makes data provided from outside of the terminal 100 visualizable using visualizing of the relationship model itself and the relationship model based on the relationship model stored in the relationship model storage means 106.

In this embodiment, the data made visualizable is converted to a form that is viewable using the browser 110 and the user may then make observations using the browser 110.

Figure 3:
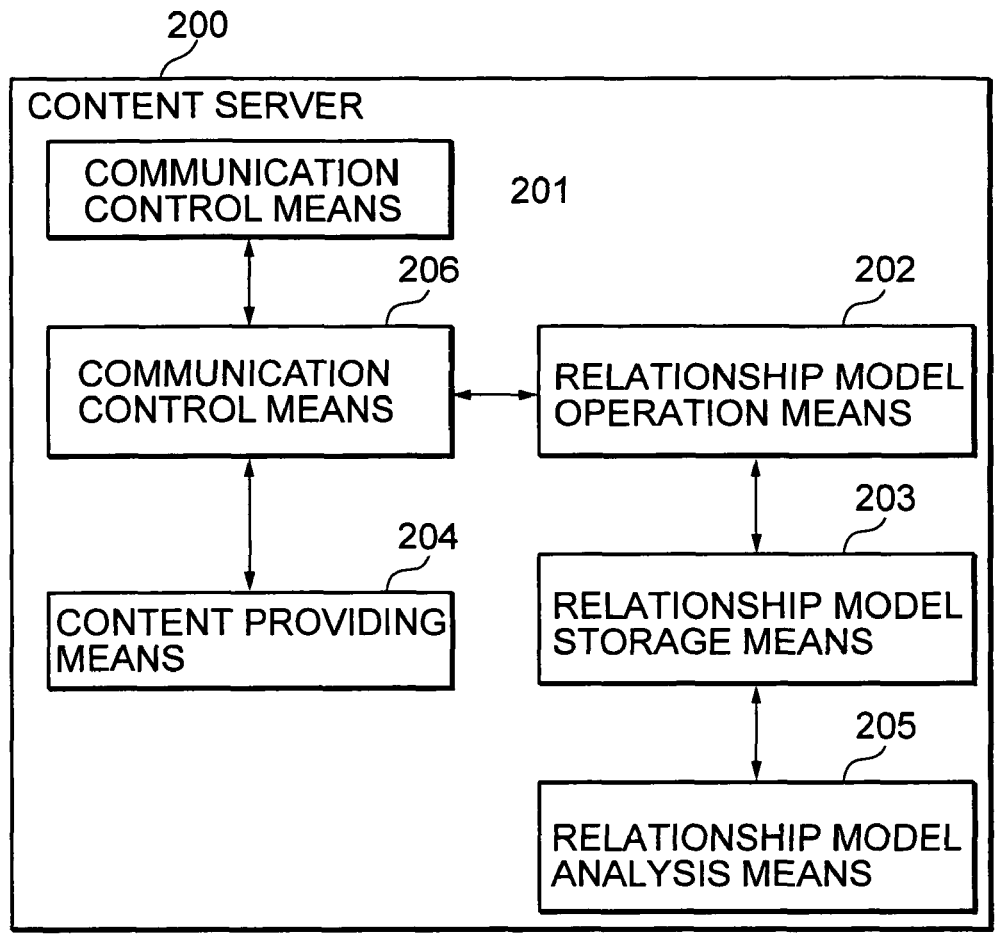
FIG. 3 is a view showing an example of a functional configuration for a content server.

FIG. 3 is a view showing an example of a functional configuration for the content server 200. The content server 200 is equipped with communication control means 201, relationship model operation means 202, relationship model storage means 203, content providing means 204, relationship model analysis means 205, and communicating control means 206, etc. The hardware configuration for the content server 200 is basically similar to that of the terminal 100.

The communication control means 201 controls communication with the terminals 100 via the network 300. The content server 200 is capable of receiving content transmission requests from the terminals 100 and sending content to the terminals 100 using the communication control means 201. The communication control means 201 constitutes transmission/receiving means, and transmission request acquisition means.

When there is an access from the terminal 100, the communication control means 201 requests input of passwords set for each user etc. so as to be able to identify the user. In this case, the communication control means 201 constitutes specifying means for specifying a source of a content transmission request and a destination for the content.

The communicating control means 206 monitors accesses to the content providing means 204 by users.

The content to be monitored is users making accesses, access time, and transmission content, etc.

The content providing means 204 manages content provided to users by the content server 200. The content providing means 204 corresponds to a WEB server in a case of a corporate WEB site. Further, a content server such as a bulletin board system etc. where content is dynamically formed from information provided by users is also possible.

The relationship model operation means 202 updates relationship models based on information monitored by the communicating control means 206. As described later, relationship models include specific relationship models generated for each party to which information is transmitted to and received from, and an overall relationship model generated for all information taken as an operating target by the content server 200. In a case of transmitting content, the relationship model operation means 202 updates specific relationship models for the targets of transmission, and updates the overall relationship models. This processing is similar to the processing carried out by the relationship model operation means 104 of the terminal 100.

The relationship model storage means 203 stores relationship models. Specific relationship models generated by the content server 200 are generated mainly for each of the users to which content is sent.

In addition to having the functions similar to those of the relationship model visualizing means 107 that the terminals 100 are provided with, the relationship model analysis means 205 also has a relationship model search (browse) function.

Figure 4:
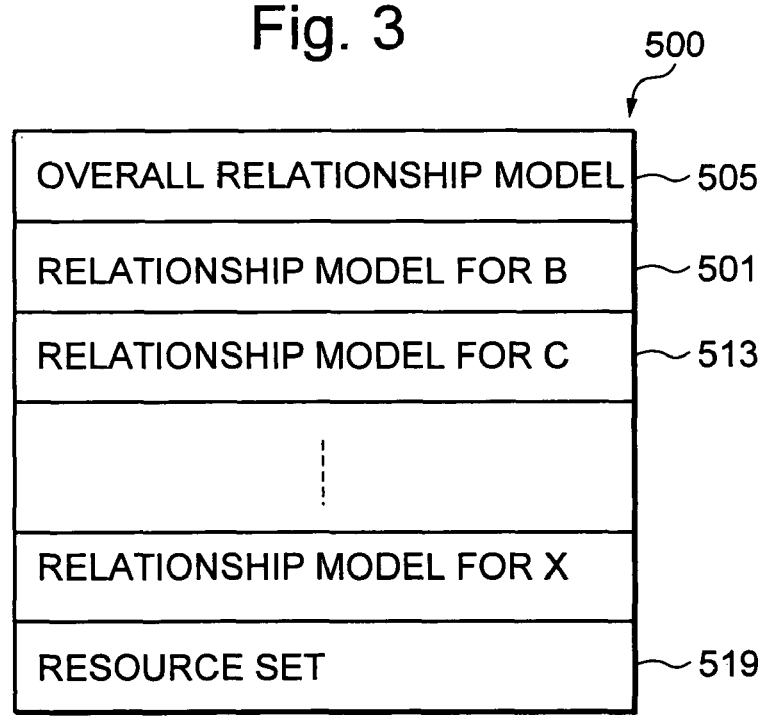
FIG. 4 is a view schematically expressing a configuration for an internal model.

FIG. 4 is a view schematically expressing a configuration for an internal model 500 generated at a terminal 100 of a user A.

The internal model 500 is comprised of an overall relationship model 505 expressing an overall resource relationship, a specific relationship model (relationship models such as a relationship model 501 for a user B, relationship model 513 for a user C, . . . , etc. generated for each specific user), and a resource set 519 constituting a set of resource nodes.

Hereafter, in a case where the overall relationship model and the specific relationship model are not particularly discriminated between, they are simply referred to as relationship models.

Figure 5:
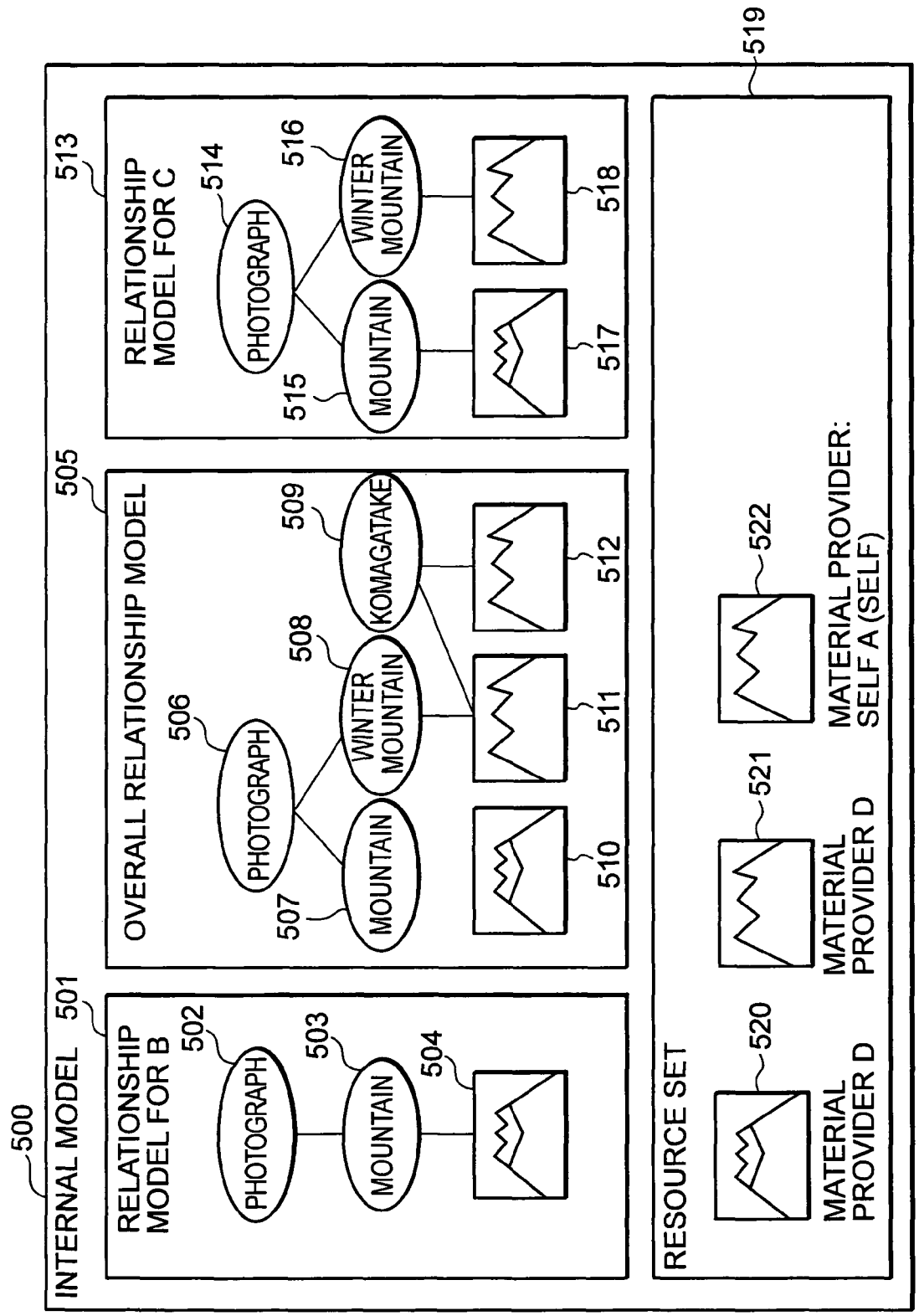
FIG. 5 is a view expressing each relationship model of an internal model graphically.

FIG. 5 is a view expressing each relationship model of the internal model 500 graphically.

The relationship model may be described using, for example, XML (Extensible Markup Language) and stored in the relationship model storage means 106.

The relationship model can be considered to be an object expressing the relationship structure of information possessed by a user.

Each relationship model is expressed using a topic node and reference information (hereinafter referred to as resource node reference information) to the resource nodes of the resource set 519.

With topic nodes having relationships, reference relationships are set in a hierarchical manner using links, with resource node reference information being set at the lowermost layer. Each item of resource node reference information sets links in relation to topic nodes.

Here, a link expresses reference relationships between topic nodes within the same relationship model or between topic nodes and resource nodes.

Keywords expressing topics (expressing resource content) are assigned in a corresponding manner at the topic nodes, and links expressing reference relationships with topic nodes that relate are provided.

For example, a relationship model 501 for a user B is comprised of topic nodes 502 and 503, and resource node reference information 504, with a keyword "photograph" being assigned to correspond to the topic node 502 and a keyword "mountain" being assigned to correspond to the topic node 503. A link is set between the topic node 502 and the topic node 503, and a link is set between the topic node 503 and the resource node reference information 504. It is then possible to know the content of a resource through the keyword.

Each relationship model is made to correlate with a source node using the resource node reference information.

For example, the resource node-reference information 504 holds reference information to a resource node 520 in the resource set 519.

Further, resource node reference information 510 for an overall relationship model 505 and resource node reference information 517 for a relationship model 513 for the user C hold information referencing to the resource node 520.

The resource set 519 is a resource node set holding reference information for resources stored in the resource storage means 105. Further, the resource node also holds information specifying a provider for the information. It is possible to specify information resources using reference information held by a resource node.

It is therefore possible to collectively manage resource nodes by not including resource nodes in individual relationship models but rather collecting resource nodes together at the resource set 519.

When resources are generated by a person himself/herself rather than being acquired from other users, then the resource provider becomes the person himself/herself.

Similarly, topic nodes 507 and 508 are set below the topic node 506 at the overall relationship model 505. The resource node reference information 510 is set to link to a topic node 507. A topic node 508 is set to have a link to resource node reference information 511. Further, the topic node 507 is set to have a link to resource node reference information 510.

Moreover, a topic node 509 is set with links to the resource node reference information 511 and resource node reference information 512.

A keyword "photograph" is set in relation to the topic node 506, and keywords "mountain", "winter mountain", and "Komagatake" are set at topic nodes 507, 508, and 509, respectively.

A set keyword is hereinafter expressed within brackets after the topic node as with topic node 506 (photographs).

In relation to the relationship model 513 for C, topic nodes 515 (mountain) and 516 (winter mountain) are set below the topic node 514 (photographs), and resource node reference information 517 and 518 is set below the topic nodes 515 and 516.

The overall relationship model 505 is generated using each specific relationship model, and although not shown in the drawings, links are set between each topic node of the overall relationship model 505 and topic nodes within specific relationship models taken to be sources generating these topic nodes.

The overall relationship model 505 can be said to be a relationship model for a user to which an internal model 500 belongs.

Links linking between topic nodes or topic nodes and source node reference information hold numerical information expressing weightings of the respective links.

As described in the following, when a resource is utilized by a user, a link weighting linking to a topic node correlated to this resource is added.

It is then possible to calculate the degree of influence on each topic node (a score expressing the height of a value felt by a user) by utilizing the weightings held by these links. Further, it is also possible to calculate a target (for other users) value for a user holding this internal model by calculating a degree of influence of a topic node within a specific relationship model because specific relationship models are generated for each target (the user B, the user C, etc.).

Namely, targets that provide resources that are used a lot by a user are considered to be of higher value to the user.

It is therefore possible to assign values to a topic node and a relationship model, so that these may be handled quantitatively. This degree of influence is generated by utilization of information (including moving). This assigning of values to the relationship model is carried out by the relationship model operation means 104, and in this case the relationship model operation means 104 is comprised of value assigning means.

When each relationship model is described using XML, the relationship model analysis means 205 of the content server 200 implements a relationship model search function using an XQuery (XML Query Language).

Next, a description is given of generation of the internal model 500. In this embodiment, a terminal 100 is equipped with means for identifying users on the network 300, and is capable of specifying subjects of communication.

Publicly known technology is used as the technology for specifying the subject of this kind of communication. The terminals 100 are equipped with specifying means for specifying a source and a destination for information.

In this embodiment, it is sufficient for a user to be distinguished only within each relationship model, and it is not necessary to unify management of the user information (internal model 500 etc.) using a specific server on the network 300.

The target of communication is by no means limited to other users, and may also be specific communities (in reality, community management sites) or specific enterprises such as music distribution companies, etc.

Meta-information (described later) appropriately describing information content is made to accompany information sent and received between the user and the communication subject as tag information.

For example, with moving images, a method of describing meta-information expressing resource content using methods such as MPEG-7 is possible.

In a case of text information such as an electronic mail etc., where meta-information such as electronic mail etc. is not described, it is possible to make the necessary data structure by applying well-known technology for extracting the topic structure of text as a graph structure to the communication control means 103.

Such technology may be, for example, "KeyGraph: Automatic Indexing by Co-occurrence Graph based on Building Construction Metaphor: Research and Technology Advances in Digital Libraries, 1998".

FIG. 6 is a view showing an example of meta-information. This meta-information is what is exchanged, at the time when an image data with a file name "image.jpg" between users, being attached with the image data. In this example, meta-information is described using XML.

Figure 7:
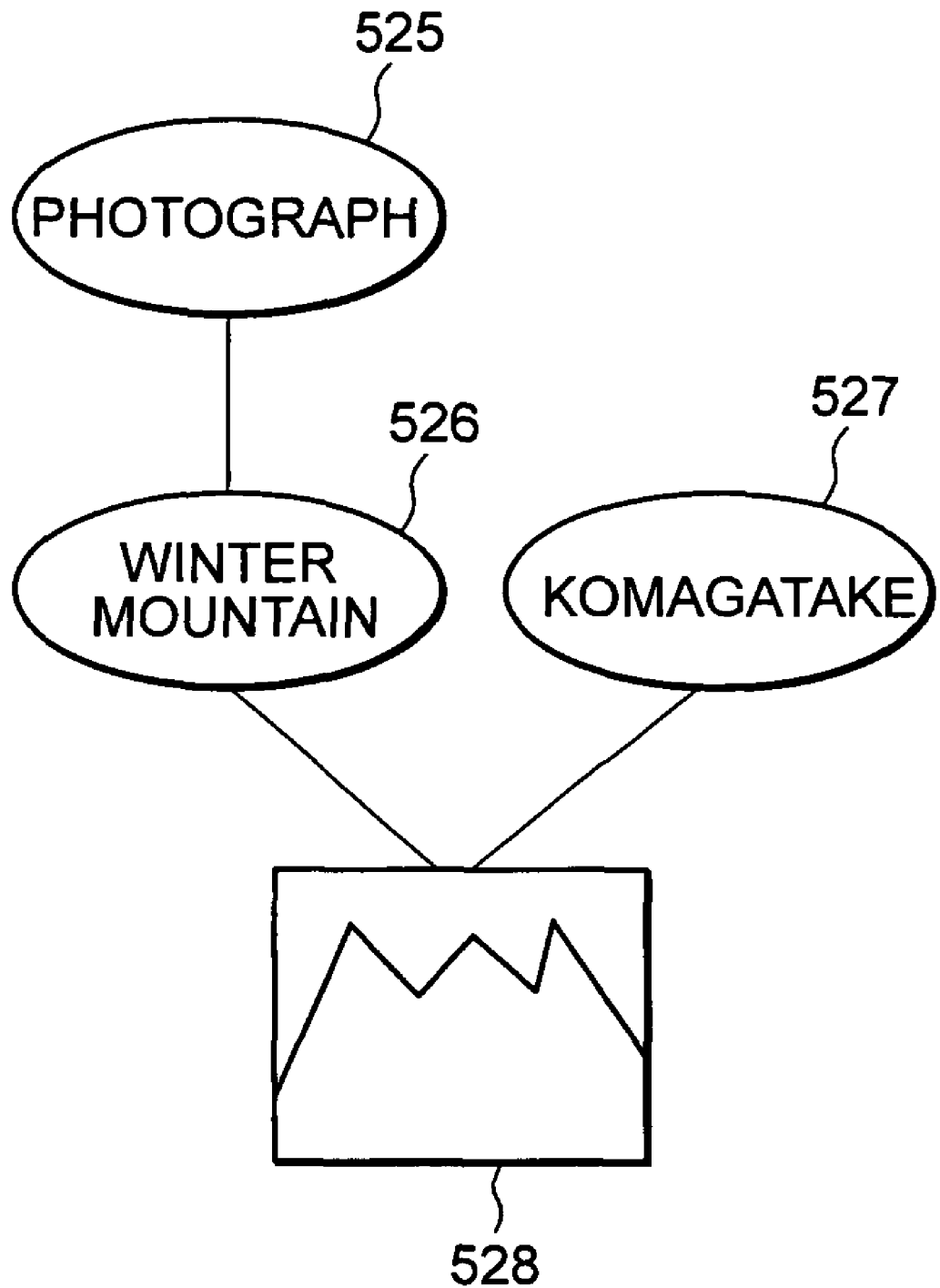
FIG. 7 is a view expressing meta-information graphically.

FIG. 7 is a view expressing this meta-information graphically. As shown in the drawings, links are set from resource node reference information 528 to topic nodes 526 (winter mountain) and 527 (Komagatake), with a further link being set from the topic node 526 (winter mountain) to a topic node 525 (photographs).

It is then possible to update the overall relationship model and the specific relationship model using this kind of meta-information.

Figure 8:
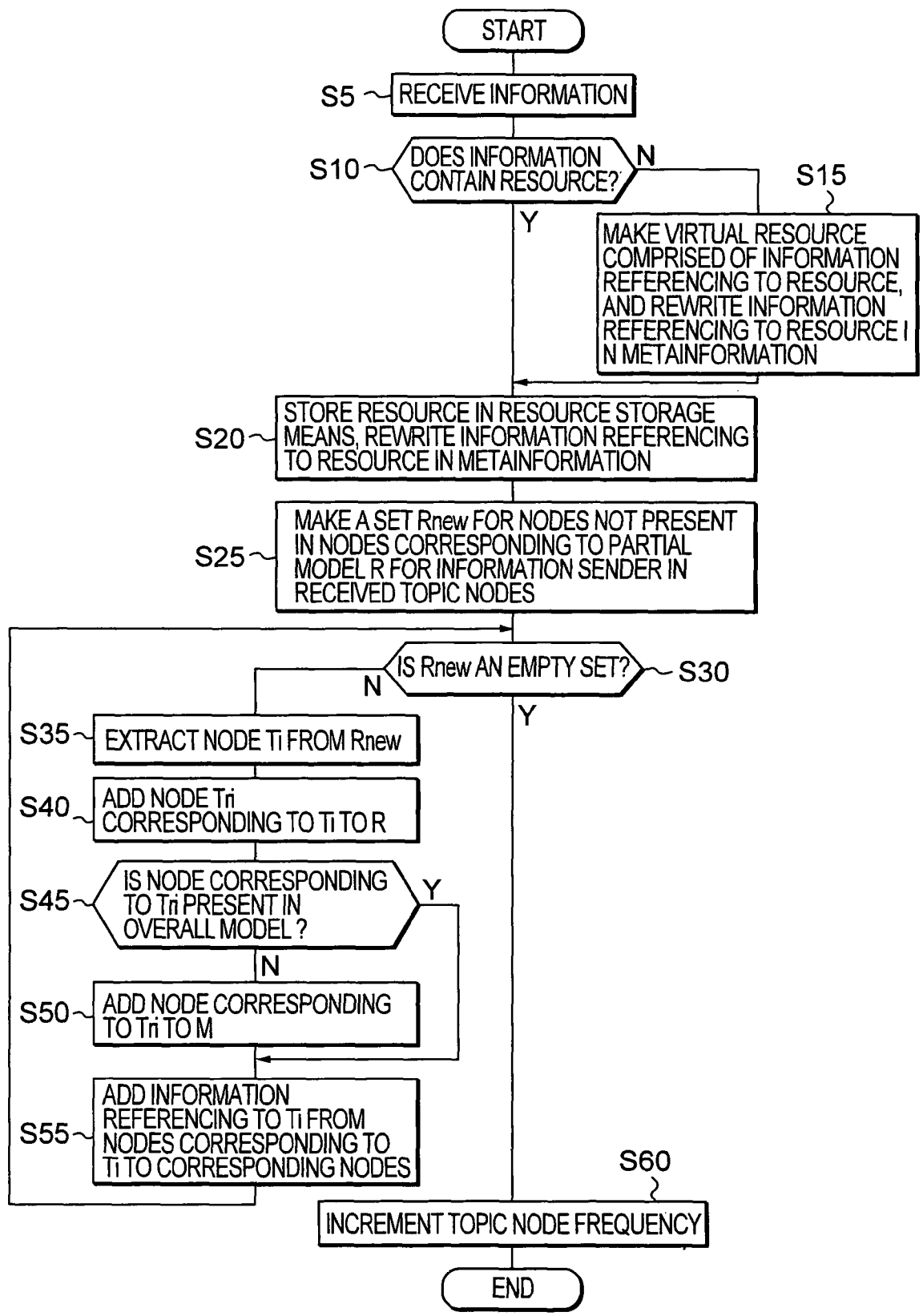
FIG. 8 is a flowchart illustrating an operation in a case where a terminal receives information.

FIG. 8 is a flowchart illustrating an operation in a case where the terminal 100 receives information.

First, information is received at the terminal 100 (step 5). This received information is then passed over from the communicating control means 103 to the relationship model operation means 104. At the same time, the received information is passed over to corresponding browsing software (the browser 110, the mail application 111, the image/moving image viewer 112, the music player 113, etc.) to enable browsing.

Next, the relationship model operation means 104 determines whether or not resource information is present in the received information (step 10). There are cases where the received information is accompanied by resources and cases where the received information is accompanied by reference information (URLs etc.) for resources existing at external content servers etc. In the case of the latter, resources are not present in the received information.

When a resource is present in the received information (step 10; Y), the resource is stored in the resource storage means 105, and information referencing to the resource in the meta-information is re-written with information referencing to the resource stored in the resource storage means 105 (step 20).

When there is no resource within the received information, the relationship model operation means 104 makes a reference resource constituted by a virtual resource comprised of information referencing to the resource and stores this in the resource storage means 105 and re-writes the resource reference information in the meta-information with information referencing to the reference resource stored in the resource storage means 105 (step 15).

Next, the relationship model operation means 104 carries out a relationship model operation based on meta-information in the received information.

First, a set of topic nodes Rnew present in the meta-information but not present in the relationship model for the provider of the information (taken to be relationship model R) is made (step 25).

Next, the relationship model operation means 104 determines whether or not Rnew is an empty set (step 30).

In a case where it is determined that Rnew is not an empty set (step 30; N), the relationship model operation means 104 extracts an arbitrary topic node Ti from Rnew (step 35).

Next, the relationship model operation means 104 adds a topic node Tri corresponding to Ti to the relationship model R (step 40). Namely, if the topic node Ti is "winter mountain", the topic node "winter mountain" is added to the relationship model R. A link weighting is also set at this time.

Next, the relationship model operation means 104 determines whether or not the topic node corresponding to Tri is present in the overall relationship model (taken to be relationship model M) (step 45).

In a case where the topic node corresponding to Tri does not exist in the overall relationship model M (step 45; N), the relationship model operation means 104 adds the topic node corresponding to Tri to the overall relationship model M (step 50).

Reference information for topic nodes corresponding to the relationship model R are then made from topic nodes corresponding to Tri of the overall relationship model (step 55).

In a case where a topic node corresponding to Tri exists in the overall relationship model (step 45; Y), the process goes to step 55.

In step 30, when the relationship model operation means 104 determines that Rnew is an empty set, i.e. in a case where adding of all topic nodes within Rnew is finished (step 30; Y), topic nodes, of the topic nodes corresponding to topic nodes contained in the received information, contained in the relationship model for the information sender, have frequency information incremented for topic nodes contained in the overall relationship model (step 60). As a result, the information receiving processing is complete.

Frequency information is used in a case of visualizing the relationship model later, etc.

In the above processing, it is possible to determine correspondence of a topic node by determining whether or not keywords of the topic nodes match. In addition, methods such as selecting topic nodes expressing the same topics using dictionary data etc. or adopting topic nodes having the same links as corresponding topic nodes based on topic node links are also possible as methods for deciding corresponding topic nodes.

In a case where the received information is not accompanied by meta-information, the user may create topic nodes and set links manually.

A specific example of the procedure described above is now described with reference to FIG. 6, FIG. 9 and FIG. 10.

Figure 9:
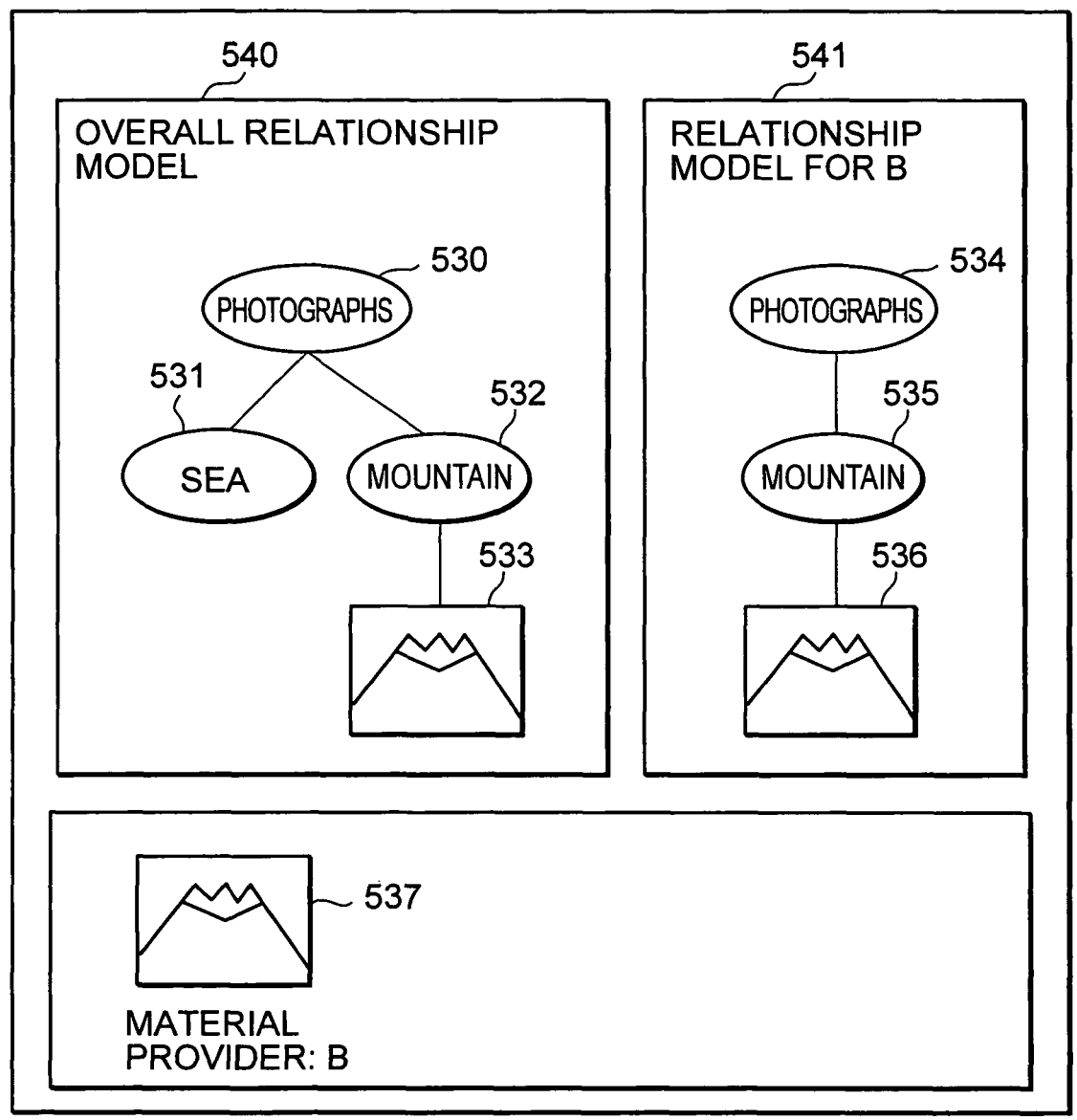
FIG. 9 is a view showing graphical expression of a relationship model possessed by a user A prior to receiving information from a user B.

FIG. 9 is a view showing a graphical representation of an overall relationship model 540 and a relationship model 541 of the internal model possessed by a user A before receiving information from a user B. In the following, the relationship model is expressed using a graphical representation.

As shown in FIG. 9, the overall relationship model 540 is such that links to a topic node 531 (sea) and to a topic node 532 (mountain) are set for a topic node 530 (photographs). Further a link to resource node reference information 533 is set as a link at the topic node 532 (mountain). The resource node reference information 533 holds reference information to a resource node 537.

The relationship model 541 for B is set with a link for between a topic node 534 (photographs) and a topic node 535 (mountain), and a further link is set between the topic node 535 (mountain) and resource node reference information 536. The resource node reference information 536 holds reference information to the resource node 537.

A case is now considered where the terminal 100 of the user A for whom the internal model is configured in the above manner receives received information accompanied by the meta-information shown in FIG. 7 from the user B.

The relationship model operation means 104 adds the topic node 526 (winter mountain) and the topic node 527 (Komagatake) not contained in the relationship model 541 for B to Rnew. Next, the relationship model operation means 104 repeats an operation of extracting elements for Rnew and adding nodes to the overall relationship model 540 and the relationship model 541 for B until all of the elements of Rnew are gone.

Figure 10:
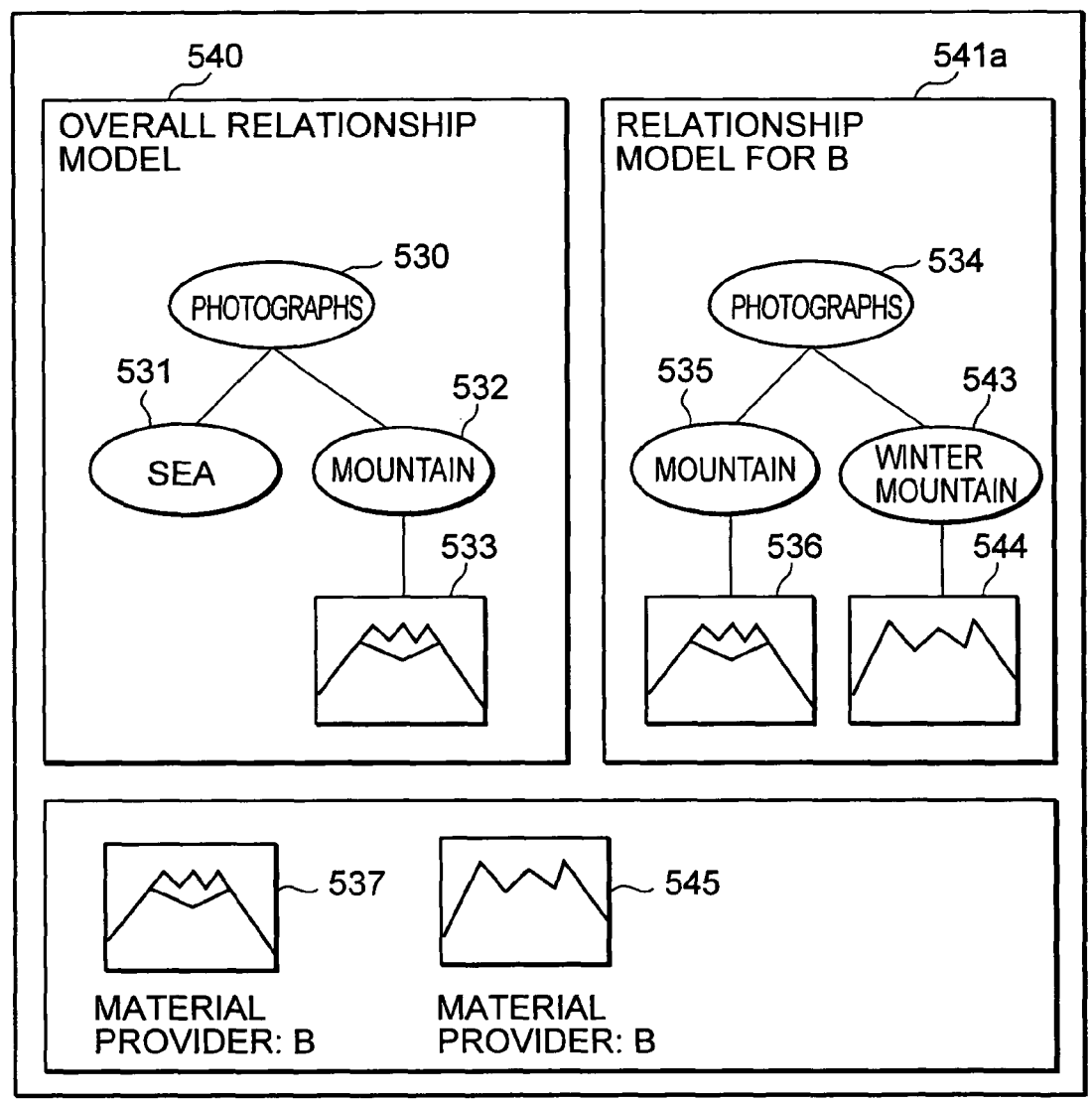
FIG. 10 is a view showing an internal model generated as a result of performing an operation.

FIG. 10 is a view showing an internal model generated as a result of performing the above operation on the internal model of FIG. 9.

The relationship model operation means 104 extracts the topic node 526 (winter mountain) from Rnew.

In doing so, the relationship model operation means 104 adds a topic node 543 (winter mountain) corresponding to the topic node 526 (winter mountain) to the relationship model 541 for B.

At this time, reference information to the topic node 525 (photographs) recorded in the received reference information is added to a topic node corresponding to the topic node 534 (photographs) of the relationship model 541 for B as a link, and an initial value is set for the link weighting. In this embodiment, this initial value is taken to be 1.

A new topic node 543 (winter mountain) is set below the topic node 534 (photographs) at a relationship model 541a for B updated by the relationship model operation means 104.

In addition, a resource node 545 attached to the received information is added to the resource storage means 105.

In a case where the received information is not accompanied by a resource but rather is accompanied by information referencing to a resource, a reference resource holding this reference information is generated and stored in the resource storage means 105. The resource node 545 holds information specifying this reference resource node.

Next, it is confirmed whether or not a node corresponding to the topic node 526 (winter mountain) exists for the overall relationship model 540. If this is not the case, an operation of adding a topic node corresponding to "winter mountain" to the overall relationship model 540 is carried out.

Reference information to topic node 543 (winter mountain) made at a relationship model 541a for B is then made from a topic node corresponding to the topic node 526 (winter mountain) generated by the overall relationship model 540 so that both parties are made to correlate with each other.

In a case where the operation is finished for the topic node 526 (winter mountain), the relationship model operation means 104 carries out a similar processing for the other topic node 527 (Komagatake) in Rnew.

Figure 11:
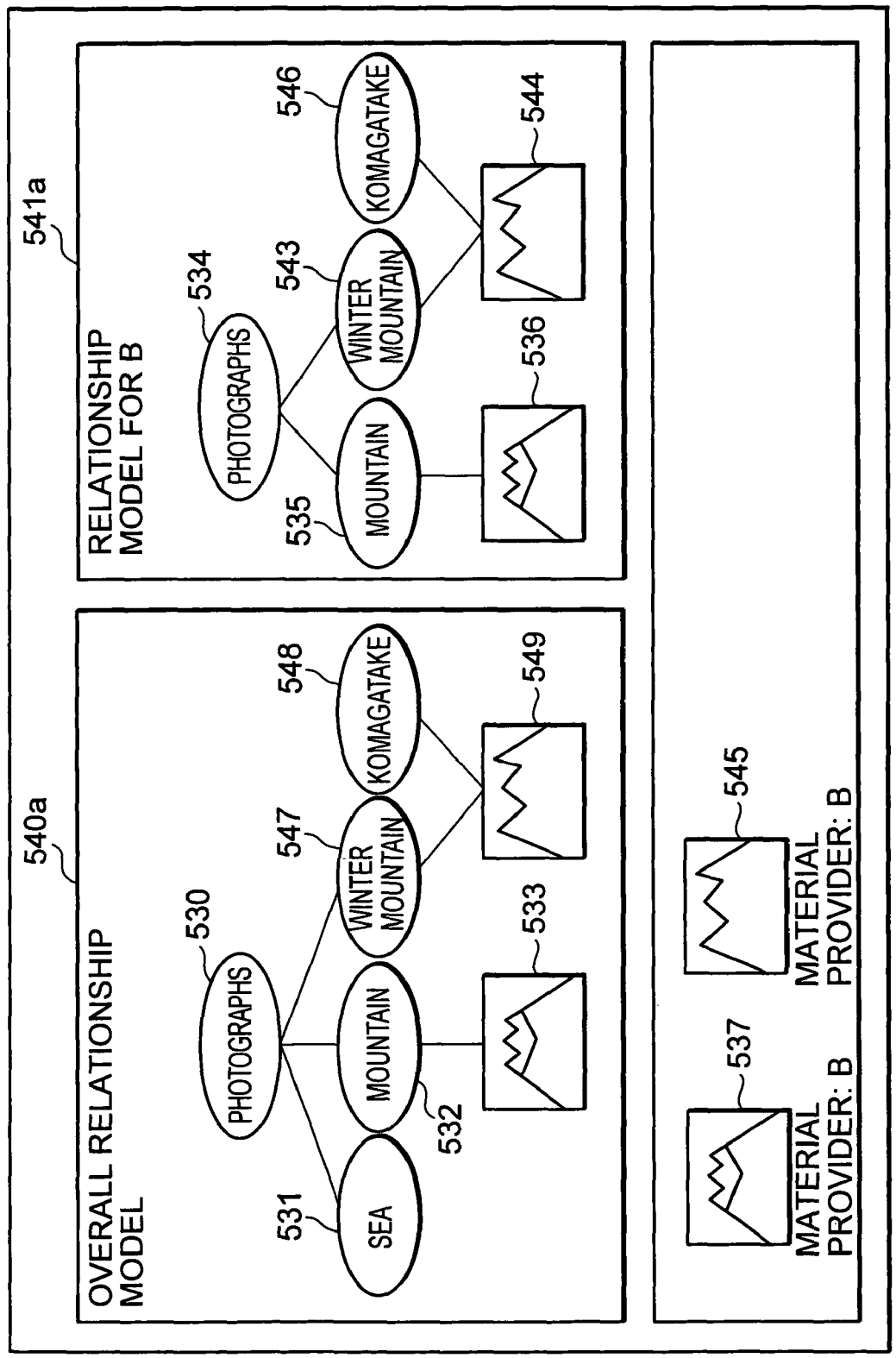
FIG. 11 is a view showing an updated internal model.

FIG. 11 is a view showing an updated internal model resulting from the above processing.

A topic node 547 (winter mountain), a topic node 548 (Komagatake) and resource node reference information 549 are added to an overall relationship model 540a. The resource node reference information 549 holds reference information to the resource node 545.

A topic node 543 (winter mountain), a topic node 546 (Komagatake) and resource node reference information 544 are added to a relationship model 541a for B. The resource node reference information 544 holds reference information to the resource node 545.

Figure 12:
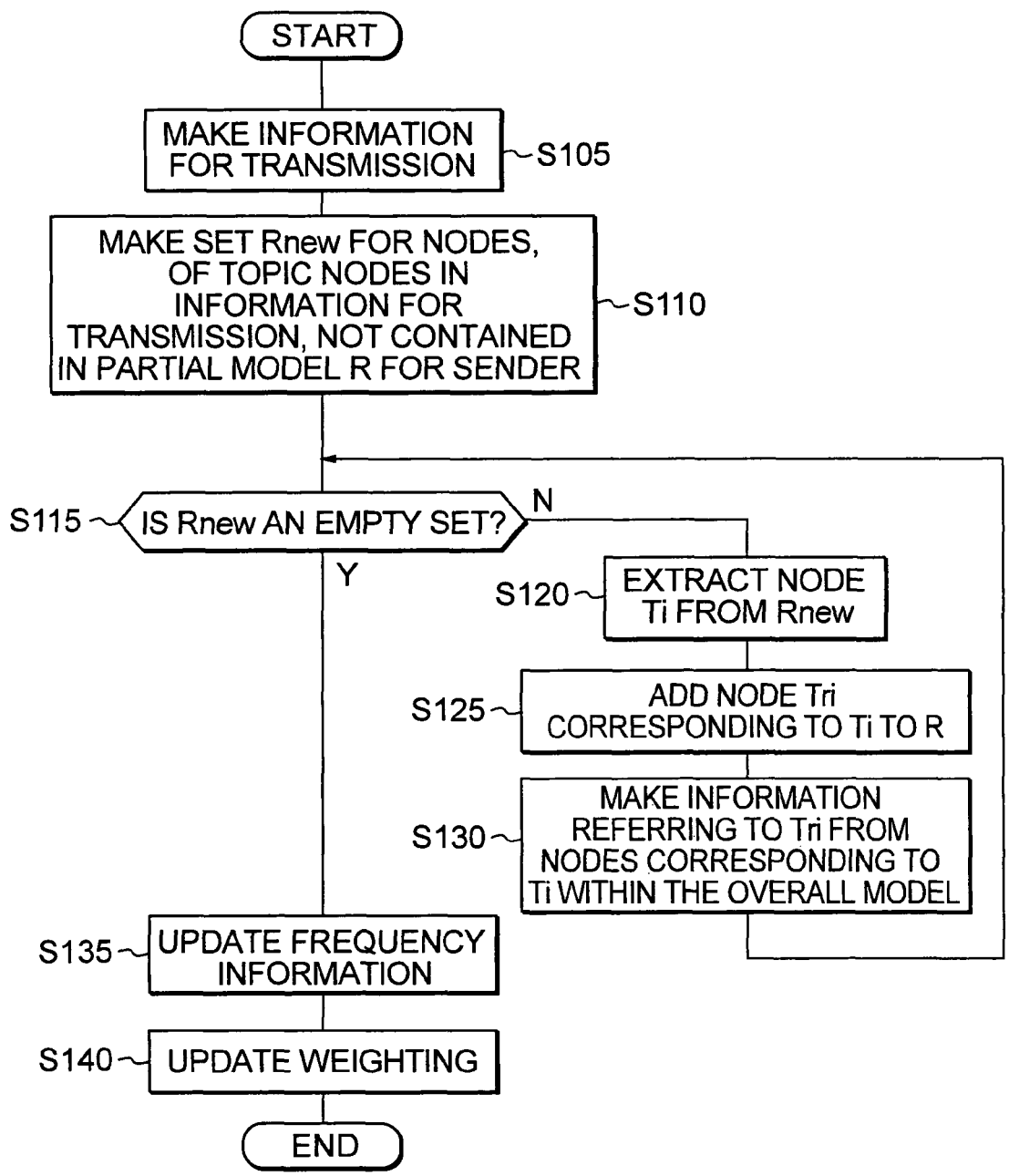
FIG. 12 is a view illustrating a case of sending a resource to another terminal.

Next, a description is given, using FIG. 12, of relationship model processing in a case of sending resources within the terminal 100 to another terminal.

Here, it is taken that a relationship model is formed using topic nodes and resource nodes present within the relationship model stored in the terminal 100 on the information transmission side with respect to transmitted resources.

First, information sent by the user is made (step 105).

For example, when the user A has sent a resource (for example, image data) received from another user in the past to another user by electronic mail, the user A carries out an operation of selecting the corresponding resource from a storage device such as a hard disc etc. within the terminal 100 and attaching the resource. At this time, the following processing is carried out within the terminal 100.

First, the file access control means 108 monitors accesses to files storing resources such as image data etc. and acquires information as to which file the user accessed. The acquired information can then be used to increase the value of accessed files.

On the other hand, the relationship model storage means 106 searches resources stored in the resource storage means 105 for attachment to transmitted information. The relationship model storage means 106 then acquires meta-information relating to the resources from the resource storage means 105 and adds this to the transmitted information as resource meta-information. Meta-information can be made by partial extraction etc. of resource node reference information correlating with the resources and the topic nodes etc. In this way, the resource storage means 105 constitutes meta-information generating means.

It is also possible for a user to attach meta-information to transmitted information themselves when provided with a tool for editing meta-information.

Next, the relationship model operation means 104 generates a set Rnew of topic nodes not contained in the relationship model (taken to be relationship model R) for the transmission subject from the transmitted topic nodes (step 110).

Next, the relationship model operation means 104 determines whether or not Rnew is an empty set (step 115).

In a case where it is determined that Rnew is not an empty set (step 115; N), the relationship model operation means 104 extracts an arbitrary topic node Ti from Rnew (step 120).

Next, the relationship model operation means 104 adds a topic node Tri corresponding to Ti to the relationship model R (step 125). Namely, if the topic node Ti is, for example, "Komagatake", the topic node "Komagatake" is added to the relationship model R.

A link to resource node reference information for the resource node referenced to by the topic node is then generated from the newly added topic node and an initial value for weighting is assigned to the link.

Next, the relationship model operation means 104 generates reference information to Tri from a node corresponding to Ti within the overall reference model (step 130). Namely, for example, when the topic node "Komagatake" is generated at the relationship model R, reference information to "Komagatake" within the relationship model R is made from the topic node "Komagatake" for the overall relationship model.

The process for the relationship model operation means 104 then returns to step 115 and the same processing is carried out for other elements within Rnew.

In a case where the relationship model operation means 104 determines in step 115 that Rnew is an empty set, i.e. in a case where processing of all of the elements within Rnew is complete (step 115; Y), frequency information is incremented so as to be updated for topic nodes, of the topic nodes contained in the transmitted information, corresponding to within the overall relationship model and the relationship model R (step 135).

Next, after updating the overall relationship model and the relationship model R, the relationship model operation means 104 updates the weighting assigned to the link (step 140) and processing is complete.

Weighting updating is carried out on the relationship model for the transmission subject, the relationship model for a provider of the transmitted information, and the overall relationship model.

For example, in a case where image data acquired from the user B is transmitted to the user C, weightings are added to the relationship model for the user B and the overall relationship model, and the value of the user B is increased. Details of the weighting updating method are described later.

Figure 13:
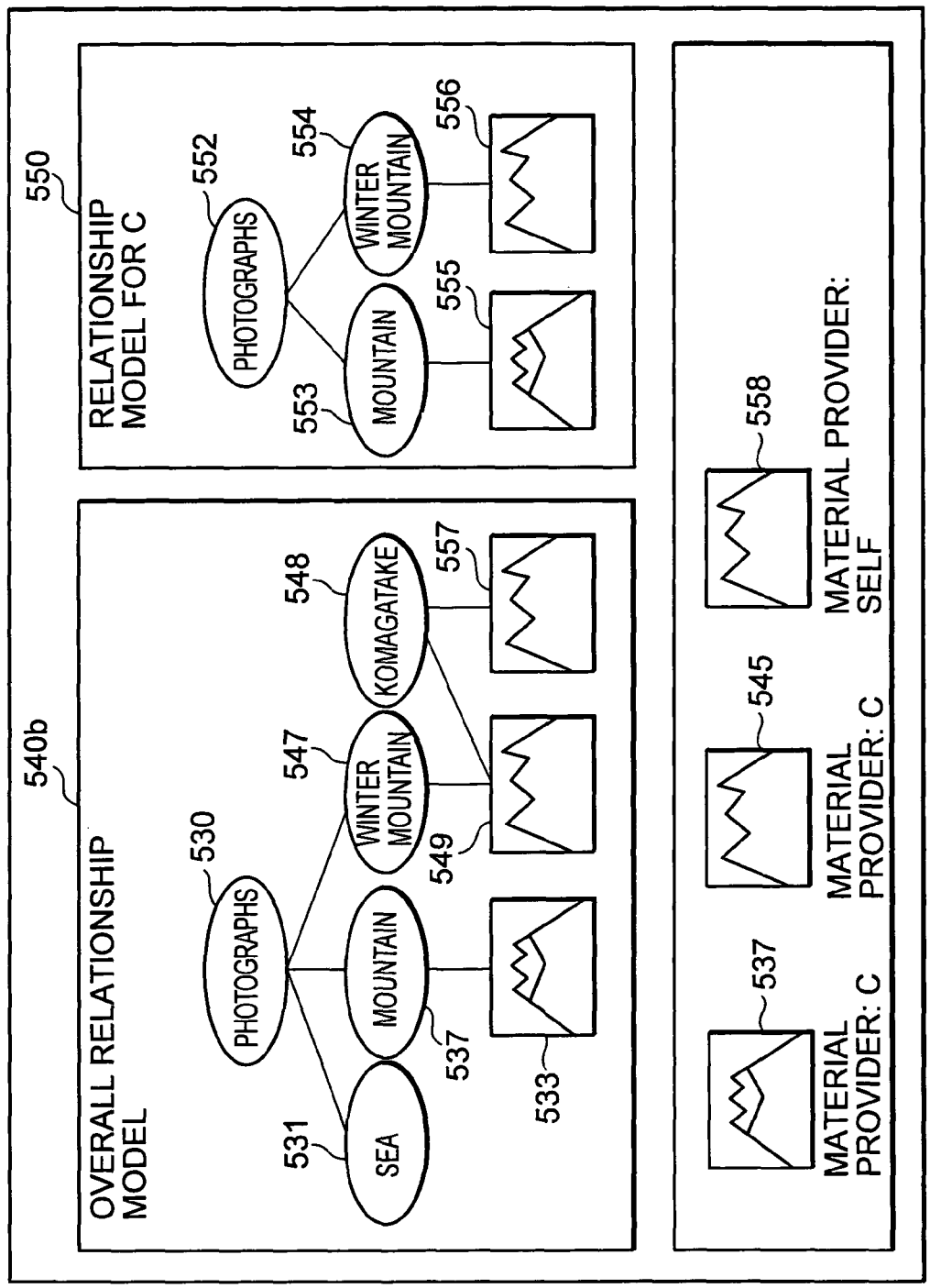
FIG. 13 is a view showing an internal model for a user A before sending information.
Figure 14:
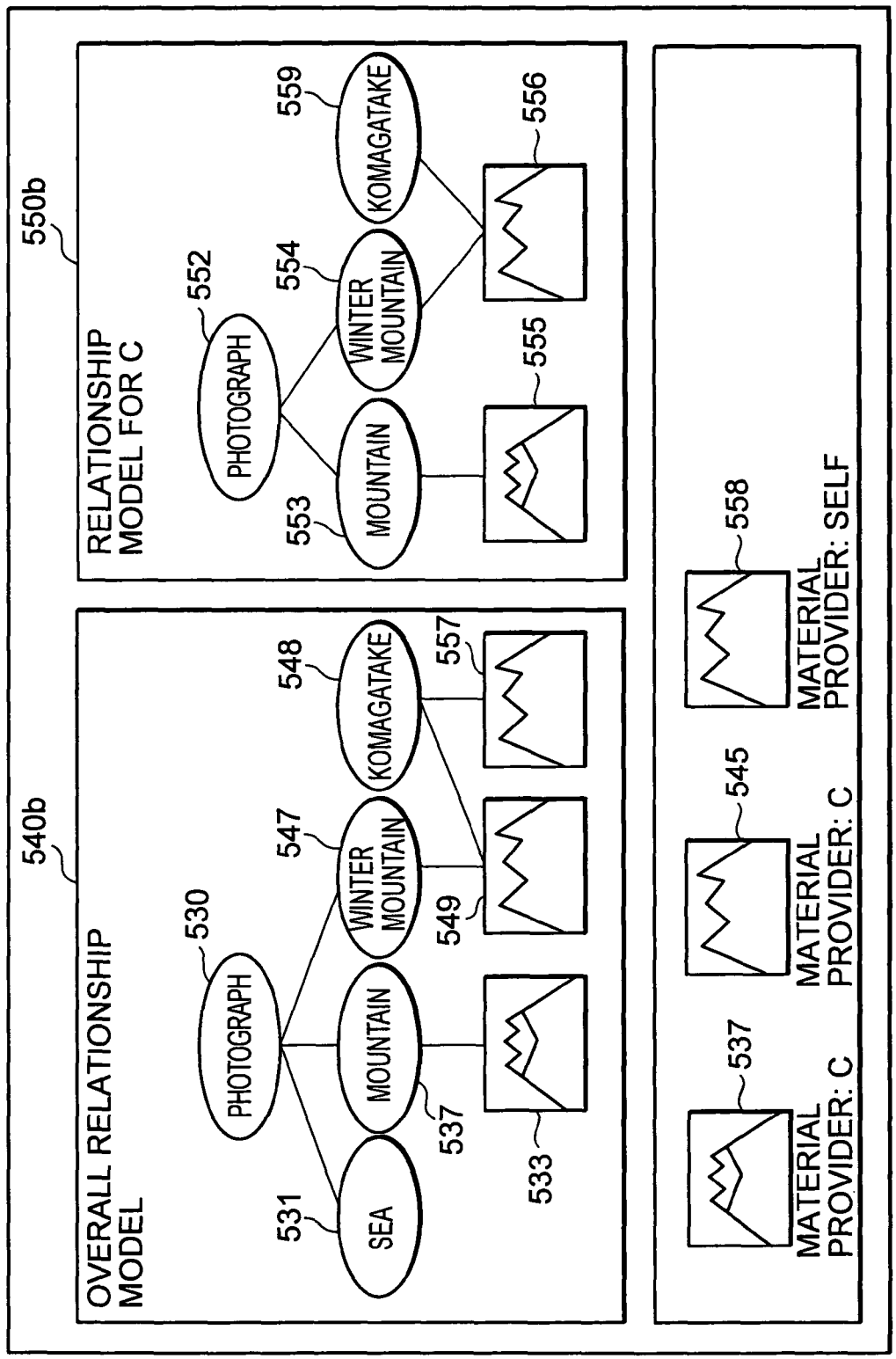
FIG. 14 is a view showing a relationship model for a user C after updating.

Processing carried out at the time of the above information transmission is described using FIG. 13 and FIG. 14 taking an example of a case of the user A transmitting Komagatake image data to the user C.

FIG. 13 is a view showing an internal model for the user A before sending information. An overall relationship model 540b is approximately the same as the overall relationship model 540a shown in FIG. 11.

At a relationship model 550 for the user C, a topic node 553 (mountain) and a topic node 554 (winter mountain) are set below a topic node 552 (photographs). Resource node reference information 555 is set below the topic node 553 (mountain), and resource node reference information 556 is set below the topic node 554 (winter mountain).

The resource node reference information 555 holds reference information to a resource node 545, and the resource node reference information 556 holds reference information to a resource node 558.

Here, for example, it is assumed that the user A transmits transmission information with the meta-information shown in FIG. 7 attached to the user C.

This meta-information is made by linking and extracting the topic node 530 (photographs), the topic node 547 (winter mountain), the topic node 548 (Komagatake), and resource node reference information 549 from the overall relationship model 540b. In this way, a topic node can be utilized as meta-information made to accompany information to be exchanged.

The making of meta-information can therefore be achieved by partially extracting relationship structures relating to the transmitted resources from the relationship models.

First, the relationship model operation means 104 makes a node set Rnew taking nodes existing in the meta-information for which nodes corresponding to the relationship model 550 do not exist for the user C as elements. Here, topic node 527 (Komagatake) is extracted as an element because a topic node corresponding to topic node 527 (Komagatake) does not exist in the relationship model 550 for user C.

Next, the relationship model operation means 104 adds a topic node corresponding to the topic node 527 (Komagatake) to the relationship model 550 for the user C. As a result, the relationship model 550 for the user C is updated as shown by the relationship model 550b for the user C shown in FIG. 14. A topic node 559 (Komagatake) is added at the relationship model 550b for the user C.

A link is then set for the topic node 527 (Komagatake) and the topic node 526 (winter mountain) with respect to the resource node reference information 528 at the meta-information shown in FIG. 7. The relationship model operation means 104 then sets links between the topic node 559 (Komagatake) and the resource node reference information 556, and between the topic node 554 (winter mountain) and the resource node reference information 556 using this information.

An initial value (for example, 1) for weighting is assigned to the relationship model 104 and at the link set for between the topic node 559 (Komagatake) and the resource node reference information 556.

In the above example, the element for Rnew is only topic node 527 (Komagatake). Therefore, after adding the topic node 559 (Komagatake), the relationship model operation means 104 makes information referencing to the topic node 559 (Komagatake) from the topic node 548 (Komagatake) constituting the corresponding node within the overall relationship model 540, and similarly updates frequency information at the time of receiving the information.

Next, the relationship model operation means 104 updates the weighting assigned to the link. In the current case, the weightings of prescribed links within the overall relationship model 540b are updated. And in addition thereto, in a case where a transmission information resource is transmitted from another user (information provider) to the user A, the weighting of the relationship model link for the information provider is updated, and the value of the information provider is increased.

Next, a description is given of a method for updating the weightings assigned to the links.

Updating of weighting is carried out when resources are utilized. Utilization of resources takes place when, for example, music data is played back by the music player 113, image data is displayed at the image/moving image viewer 112, or when resources are sent to other users, etc.

The influence of each topic node is expressed by the sum of weighting of nodes to which each topic node references. As is described later, the influence of topic nodes can be utilized as an index while evaluating the value etc. of resources.

Further, in addition to the sum of weightings of nodes to which each topic node references, influence may also be expressed using appropriate functions taking these weightings as input values.

Figure 15:
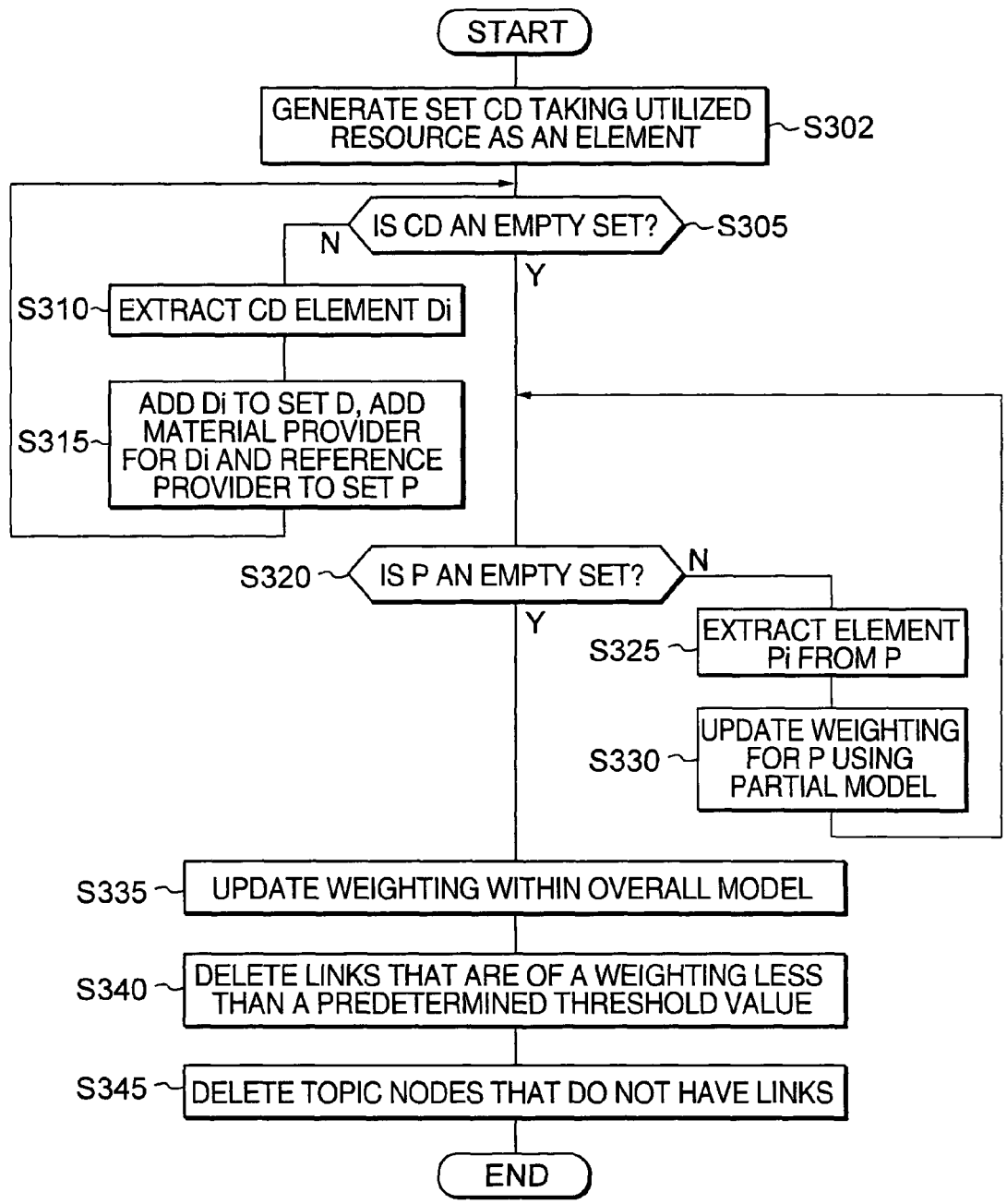
FIG. 15 is a flowchart illustrating processing in a case of updating link weightings.

FIG. 15 is a flowchart illustrating processing in a case of updating link weightings.

First, the relationship model operation means 104 acquires information specifying resources utilized from updating of weighting of a link on a previous occasion up to the current time from the file access control means 108.

Link weighting update processing may be carried out each time a resource is utilized, or may be carried out at fixed periods. Alternatively, the number of times of utilizing resources may also be updated each time a prescribed value is reached.

The relationship model operation means 104 generates a set CD taking utilized resources as elements using information acquired from the file access control means 108 (step 302).

Next, the relationship model operation means 104 determines whether or not CD is an empty set (step 305).

When it is determined that CD is not an empty set (step 305; N), arbitrary elements Di are extracted from CD (step 310).

Next, the relationship model operation means 104 adds the extracted Di to the set D.

Resource provider information is then collected for resources constituting elements within the set CD and this is added to the set P of the resource provider (step 315).

A resource provider is the user that transmitted the resource or the user that transmitted the resource reference information.

Thereafter, the relationship model operation means 104 repeats the above process until the set CD becomes an empty set.

If it is determined that the relationship model operation means 104 is an empty set (step 305; Y), it is further determined as to whether or not the set P is an empty set (step 320).

If the set P is not an empty set (step 320; N), the relationship model operation means 104 extracts an arbitrary element Pi from the set P (step 325). It can be understood that it is preferable to update which users, of the internal model, the relationship model takes as targets, using this element Pi.

Next, the relationship model operation means 104 updates the weightings (step 330) assigned to links for the relationship model for the extracted element Pi (expressing the user).

Updating of weighting is carried out, for example, as follows. A determination is made for the relationship model for the element Pi (user) as to whether or not a resource node holding reference information to an element Di of set D is present.

If a resource node holding information referencing to the Di is present, the weighting assigned to links between this resource node and the topic node set with this link is updated so as to be increased by a prescribed number (for example, 1). Further, weightings assigned for links between this topic node and other topic nodes set with this link are similarly updated. The topic node is then similarly gone back to a prescribed number of times (for example, three), and weighting assigned to the link during this time is similarly updated.

Thereafter, the relationship model operation means 104 repeats the above updating processing on the element Pi until the set P becomes an empty set.

If the set P is determined to be an empty set, i.e. if the relationship model has been updated for all Pi, the relationship model operation means 104 carries out link weighting updating for the overall relationship model (step 335). Updating of this weighting is carried out, for example, as follows.

The relationship model operation means 104 determines whether or not reference information for the element Di of the set D of the resource nodes for the overall relationship model is held.

In a case where, of the resource nodes, reference information for the element Di is held, weightings assigned to the links are updated in a same manner as in step 330. Namely, the links are gone back a prescribed number of times taking this resource node as a starting point and the weightings assigned to these links are increased by just a prescribed number of times.

Next, the relationship model operation means 104 deletes links linking topic nodes in the overall relationship model for which the weighting is less than a predetermined threshold value (step 340).

Here, link weighting is set so as to reduce with time, so that weightings of links relating to resources that are not used so often can be set to become small in accordance with time lapsing. As a result, it is possible to delete links relating to resources that are not used using step 340.

Next, if topic nodes which do not have links occur as a result of deleting the links, the relationship model operation means 104 deletes these topic nodes (step 345) and processing is complete.

The link weighting updating method is by no means limited to the above, and other methods may also be used. A weighting updating method may be, for example, the active propagation model (P. Pirolli, J. Pitkow, R. Rao; Silk from a Sow's Ear: Extracting Usable Structures from the Web, CHI-96).

In the active propagation model, an incidence matrix is generated by combining specific relationship models and overall relationship models. In the incidence matrix, connections between topic nodes and connections between topic nodes and resources are expressed using a matrix.

In a case where a resource is utilized in this model, an active value is inputted from the resource and made to propagate in the incidence matrix. In the active propagation model, it is possible to update weightings of links for the whole model without individually updating weightings of nodes for individual relationship models. For example, in an example in FIG. 16, active values are inputted for a link 561 and a link 568.

Figure 16:
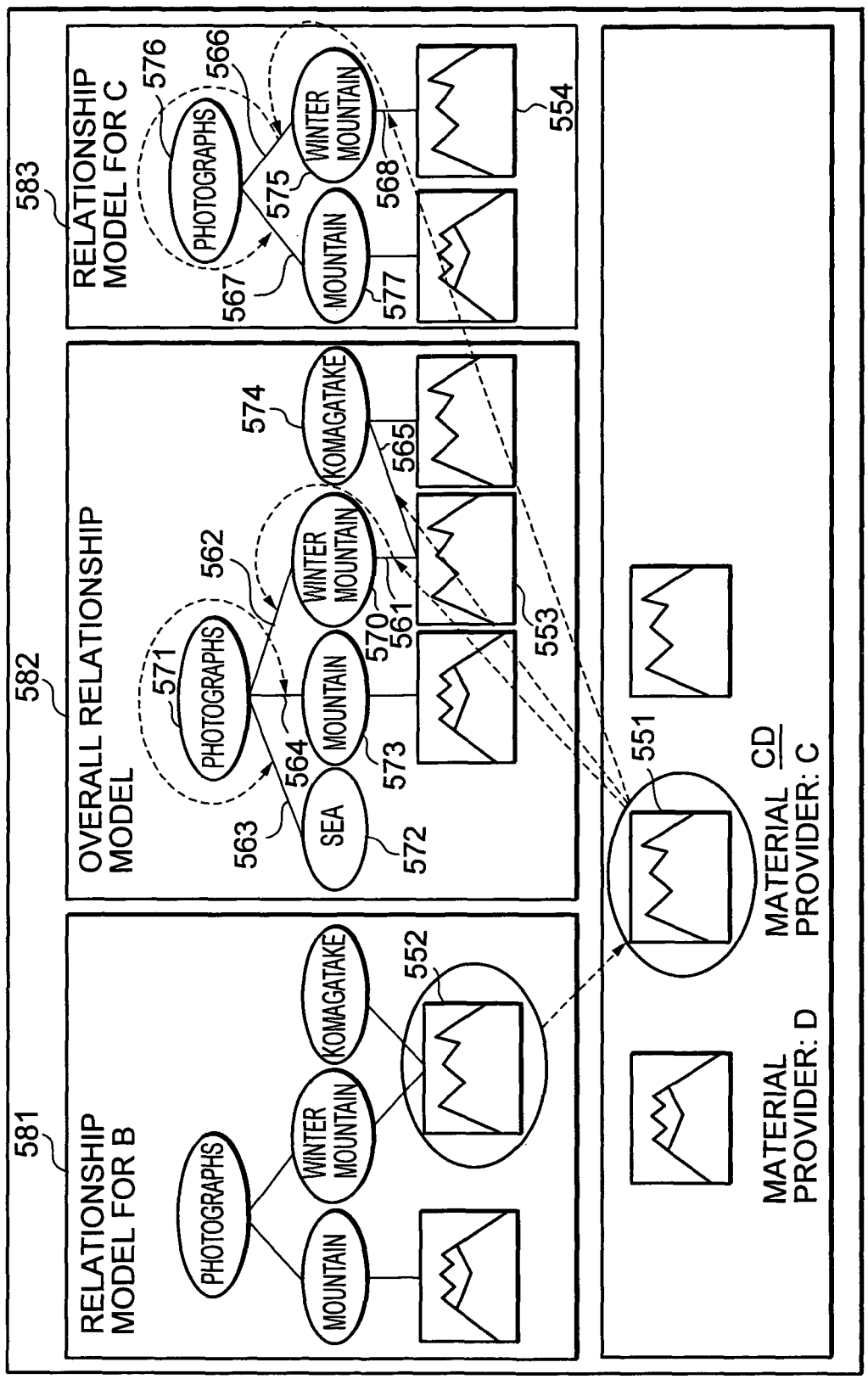
FIG. 16 is a view illustrating weighting update processing.

FIG. 16 is a view illustrating weighting update processing.

FIG. 16 shows an internal model for a user A. The internal model for the user A is taken to be configured from a relationship model 581 for the user B, a relationship model 583 for the user C, and an overall relationship model 582. Further, it is assumed that resource node reference information 552, 553 and 554 are to hold information referencing to a resource node 551.

It is assumed that the user C is to be a provider of a resource referenced to by the resource node 551. The user A is assumed to transmit a resource 551*a* transmitted from the user C to the user B.

Further, the relationship model 581 for the user B and the overall relationship model 582 are assumed to be updated according to the flowchart of FIG. 8.

At this time, an element of a set CD is {resource 551*a*} and an element of a set P is {C}.

The relationship model operation means 104 extracts element "C" from the set P, and as a result, recognizes a relationship model 583 for C as a target of weighting update processing.

The relationship model operation means 104 specifies resource node reference information 554, of the relationship model 583 for C, holding reference information for the resource node 551. The weighting of the link 568 between the resource node reference information 554 and the topic node 575 (winter mountain) set with a relationship referencing with this node is then increased by a prescribed value. Next, the weighting of a link 566 for between topic node 575 (winter mountain) and topic node 576 (photographs) for which a relationship referencing with this node is set is increased by just a prescribed value.

Further, the weighting of a link 567 for between topic node 576 (photographs) and topic node 577 (mountain) for which a relationship referencing with this node is set is increased by just a prescribed value.

In this way, the relationship model operation means 104 then goes back to the topic nodes three times along the links taking the resource node reference information 554 as a starting point, so as to update the weightings assigned to the links.

Next, the relationship model operation means 104 specifies the resource node reference information 553, of the overall relationship model 582, holding reference information for the resource node 551, as a starting point for weighting update processing.

First, weighting of the link 561 between the resource node reference information 553 and the topic node 570 (winter mountain) set with a relationship referencing with this then being increased by a prescribed value.

Next, the weighting of a link 562 for between the topic node 570 (winter mountain) and the topic node 571 (photographs) for which a relationship referencing with this node is set is increased by just a prescribed value.

Next, the weightings of the links 563, 564 for between the topic node 571 (photographs), the topic node 572 (sea) for which a relationship referencing with this node is set, and the topic node 573 (mountain), are increased by just a prescribed value.

The relationship model operation means 104 then goes back to the topic nodes three times along the links taking the resource node reference information 553 as a starting point, so as to update the weightings assigned to the links.

Further, the relationship model operation means 104 then increases the weighting of a link 565 between the resource node reference information 553 and the topic node 574 (Komagatake) set with a relationship referencing with this node by a prescribed value. As there is no topic node for which a link is set for the topic node 574 (Komagatake) the updating of weighting relating to the topic node 574 (Komagatake) ends at this point.

As described above, the relationship model operation means 104 constitutes value assigning means for assigning values to topic nodes, changing means for changing these values, node value acquisition means for acquiring values of topic nodes, link specifying means for specifying links of a link weighting less than a prescribed threshold value, canceling means for canceling reference relationships using for links specified by the link specifying means, and deleting means for deleting topic nodes for which referencing topic nodes and resource nodes do not exist.

Next, a description is given of updating of a relationship model for a case of a method utilizing a reference resource.

In a case of utilizing a reference resource, after a user receives resource reference information from another user etc., actual resources are accessed using this reference information.

For example, when a URL for downloading a certain song is received from a friend, a content server site for distributing this music is accessed using this URL and the song is downloaded.

In this way, in the case of utilizing a reference resource, in addition to updating the relationship mode with respect to the user sending this reference information, it is also necessary to update the relationship model with respect to the site that is the destination of this reference.

Figure 17:
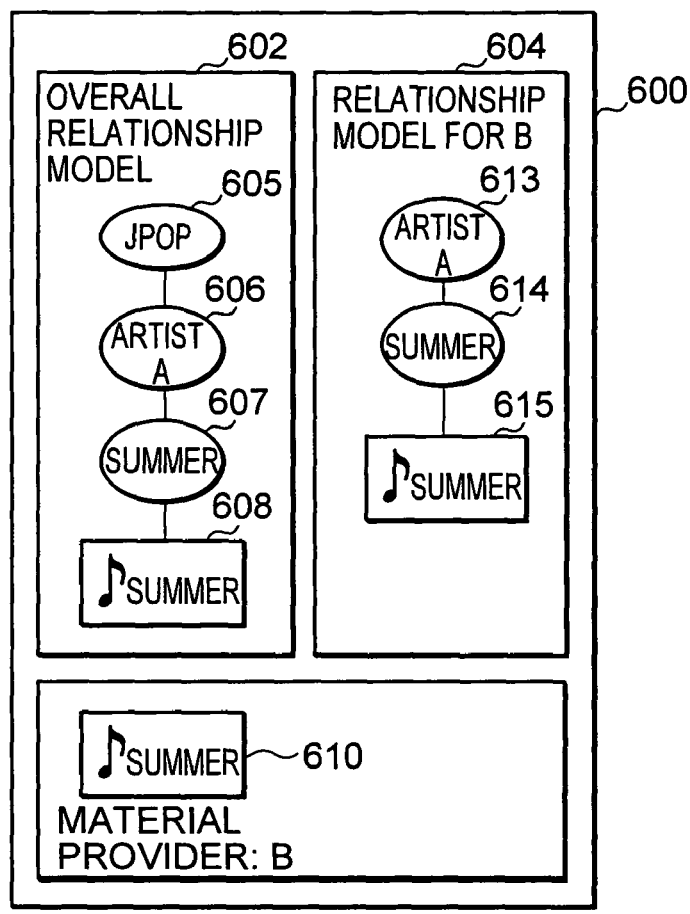
FIG. 17 is a view showing a relationship model after updating.

It is assumed that an internal model 600 shown in FIG. 17 is held at the terminal 100 of the user A.

The state of the relationship model of FIG. 17 shows a state where meta-information for a song "summer" and reference information to the song "summer" are received from the user B and where updating has taken place.

At an overall relationship model 602, links are set at a topic node 605 (JPOP), a topic node 606 (artist A), a topic node 607 (summer), and resource node reference information 608.

The resource node reference information 608 also holds reference information to the resource node 610. The resource node 610 holds reference information to a reference resource generated based on the reference information to the song "summer" received from the user B and information specifying the user B being a provider of the information.

A topic node 613 (artist A), a topic node 614 (summer) and resource node reference information 615 are set as links at a relationship model 604 for B. The resource node reference information 615 also holds reference information to the resource node 610.

It is then assumed that the user A receives the song "summer" from a site A of a content server 200 using the reference information held by the reference resource specified by the reference information held by the resource node 610.

Figure 18:
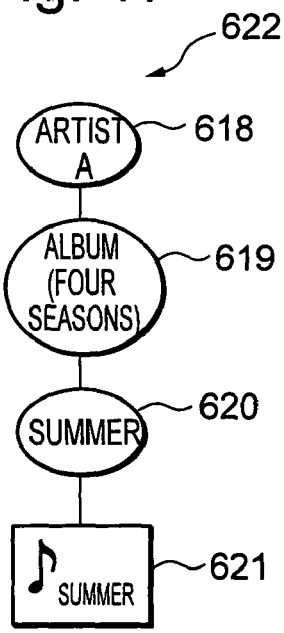
FIG. 18 is a view schematically expressing a configuration for transmitted information.

FIG. 18 is a view schematically expressing a structure of meta-information 622 sent so as to accompany the resource for the song "summer" in a case where the site A sends the song "summer".

The meta-information 622 is comprised of a topic node 618 (artist A), a topic node 619 (album "four seasons"), a topic node 620 (summer) and a resource node 621.

Figure 19:
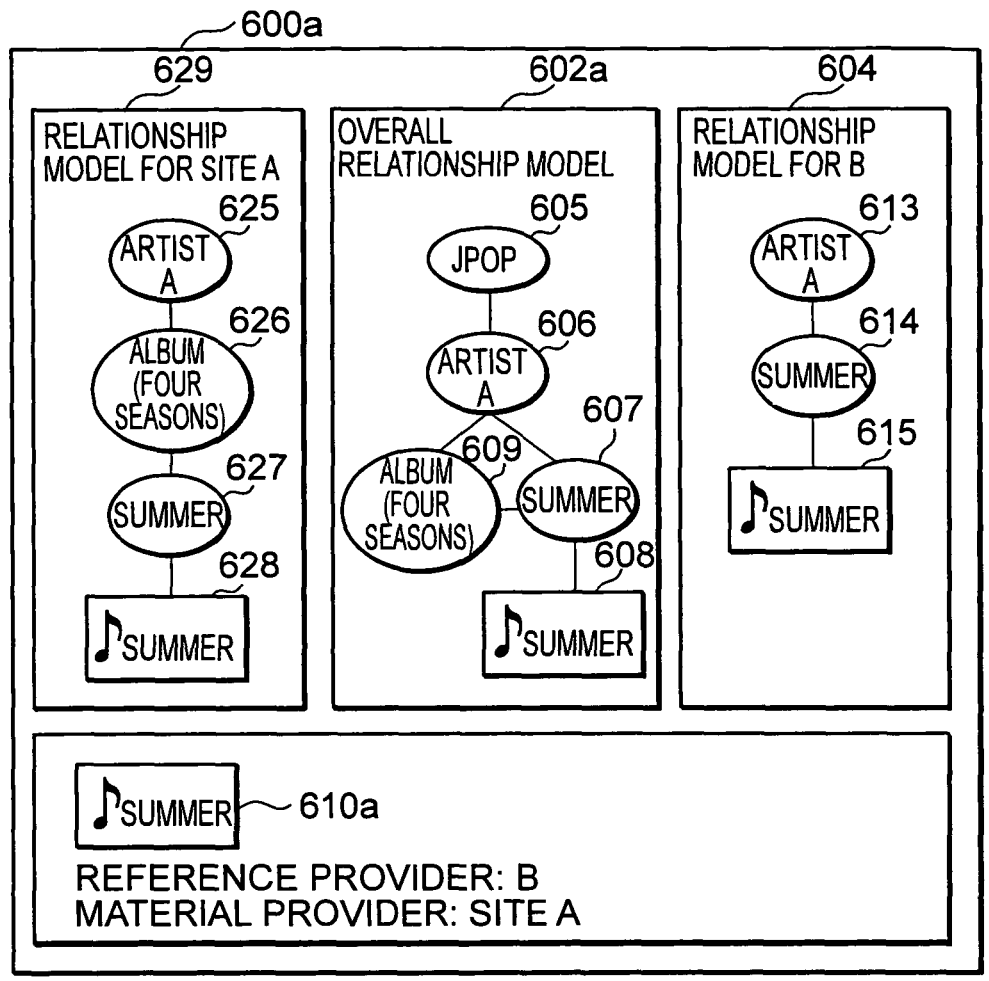
FIG. 19 is a view showing an internal model.

After the meta-information 622 is received, the relationship model operation means 104 updates the internal model 600 and generates an internal model 600*a* shown in FIG. 19.

A topic node 609 (album "four seasons") is inserted between the topic node 606 (artist A) and the topic node 607 (summer) in an overall relationship model 602*a*. A relationship model 629 can then be generated for the site A of the content server 200.

At the relationship model 629 for the site A, in the meta-information 622, a topic node 625 (artist A), a topic node 626 (album "four seasons"), a topic node 627 (summer), and resource node reference information 628, corresponding to the topic node 618 (artist A), the topic node 619 (album "four seasons"), the topic node 620 (summer) and the resource node 621, respectively, are generated by the relationship model operation means 104.

The resource node reference information 628 holds reference information to the resource node 610*a*.

The resource node 610*a* is obtained by replacing the resource node 610 with the resource node 621.

In addition to the reference information for the downloaded resources, the resource node 621 holds information specifying the user B and the site A.

In this way, in cases where resources are accessed using a reference resource, in addition to information specifying the information provider of information taken as the source for making the reference source, information specifying resource access destinations is held at the resource node.

The relationship model operation means 104 then updates weightings assigned to links for the relationship model 629 for the updated site A, the overall relationship model 602*a*, and the relationship model 604 for B.

In this way, in a case where resources are accessed using a reference resource, in addition to increasing the value of the information provider of the information taken as a source for making this reference resource, the value of the destination of this resource also increases.

Next, a description is given of an information pushing method for providing useful information to users using relationship models.

The site A of the content server 200 is assumed to hold meta-information relating to a plurality of albums and songs of the artist A. At this time, if the value of a song within these songs is felt to be high by a user, it is possible to invite the user to purchase songs by recommending other songs of the artist A to the user.

In a case where a topic value is being made high as a result of updating weighting assigned to a link, it is possible to push the following information.

Figure 20:
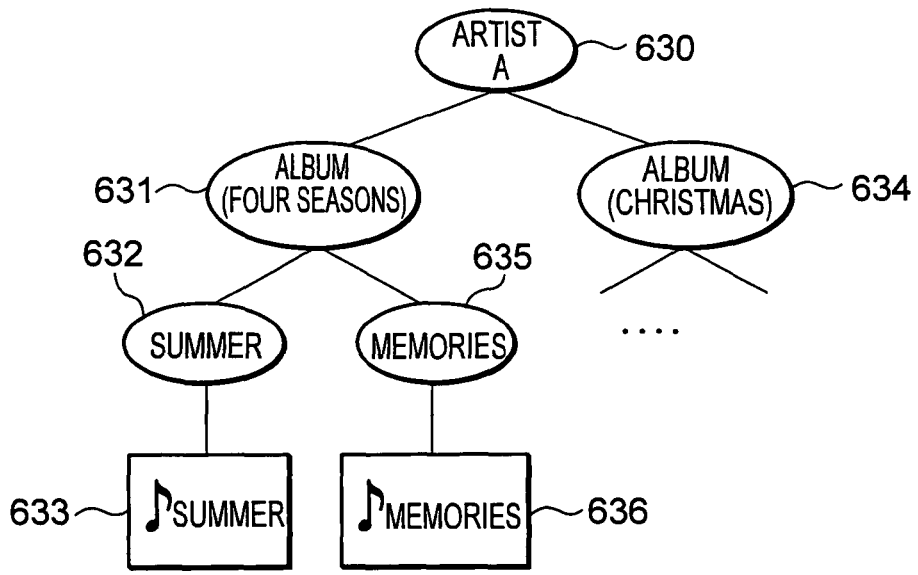
FIG. 20 is a view showing meta-information.

Now, it is assumed that the user makes a request to the site A for transmission of the song "summer". At this time, the meta-information shown in FIG. 20 is assumed to be held at the site A.

Namely, a topic node 630 (artist A), a topic node 631 (album "four seasons"), a topic node 632 (summer), and a resource node 633 (summer) are connected through direct linking, a topic node 634 (album "Christmas") is derived from the topic node 631 (album "four seasons"), and a topic node 635 (memories) and a resource node 636 (memories) are derived from the topic node 631 (album "four seasons").

There are various methods for determining which portion of the meta-information the site A sends in line with the song "summer". However, in this embodiment, information obtained by following a direct link from the resource node to the artist information is sent as a topic node, with this then being sent as an invisible topic node provided with activation conditions for nodes derived from the topic node.

In this way, the topic nodes 630, 631 and 632 are sent as usual topic nodes, and the topic nodes 634 and 635 are sent as the invisible topic nodes conferred upon the activation information.

Herein, activation information is information defining activation conditions for changing invisible topic nodes to typical topic nodes, and behavior at that time.

In this embodiment, in cases where influence (value) of the topic node set with a link to an invisible topic node satisfies predetermined conditions, a message is presented to the user. Presentation of a message is carried out via software used by the user at that time. This function is implemented by the communicating control means 103. In this case, when the topic node satisfies prescribed conditions, the communicating control means 103 is configured from execution means for executing information processing preset at the topic node.

Figure 21:
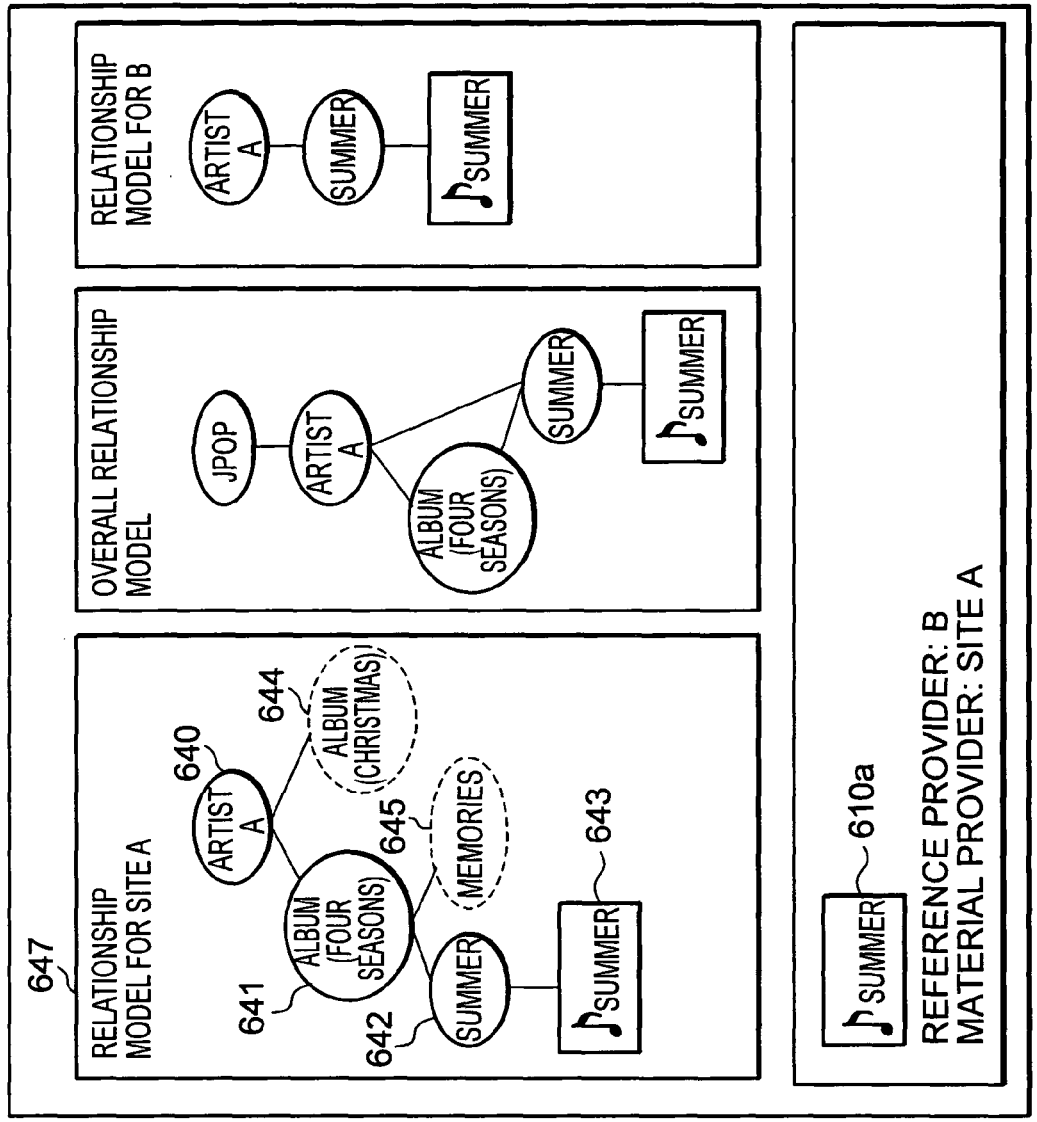
FIG. 21 is a view showing an internal model containing a topic node prior to activation.

FIG. 21 is a view showing an internal model for terminal 100 updated using the meta-information shown in FIG. 20.

A relationship model 647 for the site A corresponds to the meta-information shown in FIG. 20, with topic nodes 640 (artist A), 641 (album "four seasons"), 642 (summer) and resource node reference information 643 (summer) having links set by direct linking. On the other hand, a topic node 644

(album "Christmas") and a topic node 645 ("memories") are held as invisible topic nodes. Invisible topic nodes are shown using dotted lines.

Figure 23:
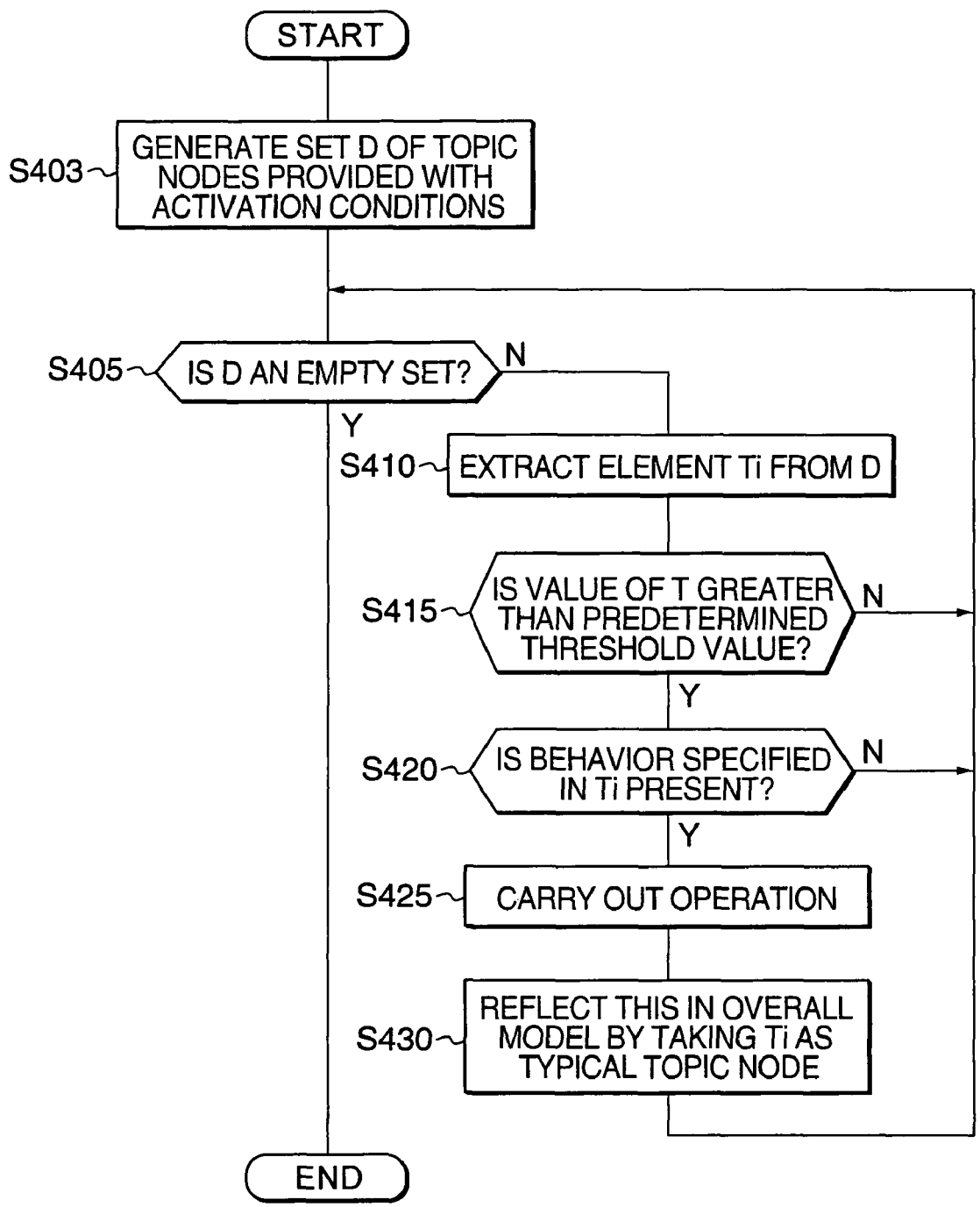
FIG. 23 is a flowchart illustrating processing for activating invisible topic nodes.

Then, in a case where weighting of a node changes as a result of a user utilizing the song "summer", invisible topic nodes satisfying the activation conditions are activated in accordance with the order shown in the flowchart of FIG. 23.

The activated topic nodes, for example, carry out predetermined behavior such as the showing of, for example, advertisements, to users.

In cases where invisible topic nodes are activated, in addition to adding topic nodes to the overall model, invisible topic nodes are also changed to typical topic nodes for relationship models holding invisible topic nodes.

Figure 22:
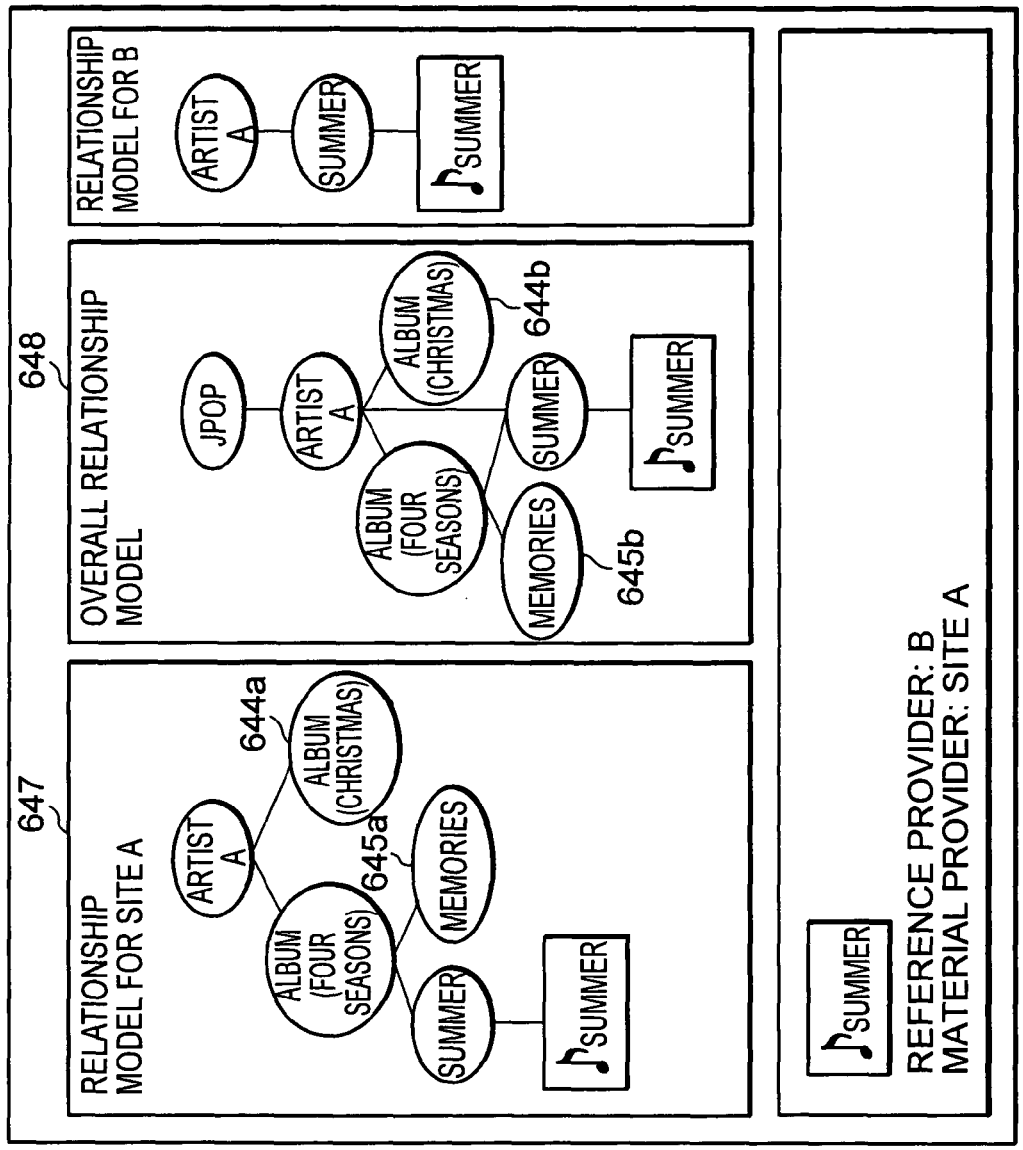
FIG. 22 is a view showing an internal model for a case where a topic node is activated.

FIG. 22 is a view showing an internal model for the case where topic nodes 644 and 645 of FIG. 21 are activated.

At a relationship model 647 for the site A, topic nodes 644 and 645 are activated and changed to usual topic nodes 644a and 645a.

Further, new topic nodes 644b and 645b are added at an overall relationship model 648.

Advertisement information relating, for example, to an album "Christmas" and a song "memories" can then be displayed at the terminal 100 in accompaniment with activation of the topic nodes 644 and 645. Advertisements may be carried out through the displaying of images or the playing back of audio, etc.

FIG. 23 is a flowchart illustrating order of activation of invisible topic nodes.

First, the relationship model operation means 104 extracts topic nodes, of the internal model, which have been given activation conditions, and generates a set D taking these as elements (step 403).

Next, the relationship model operation means 104 determines whether or not the set D is an empty set (step 405).

If the set D is an empty set, i.e. in a case where invisible topic nodes are not present within the internal model (step 405; Y), the processing ends.

If the set D is not an empty set (step 405; N), the relationship model operation means 104 extracts an arbitrary element Ti from the set D (step 410).

Next, the relationship model operation means 104 determines whether or not an influence degree (value) of the element Ti is greater than a predetermined threshold value (step 415).

If the influence degree of the element Ti is not greater than a predetermined threshold value (step 415; N), the processing of the relationship model operation means 104 returns to step 405, and a similar processing is carried out for another element Ti.

If the influence degree of the element Ti is greater than the predetermined threshold value (step 415; Y), the relationship model operation means 104 determines whether or not behavior designated at the element Ti is present (step 420).

In a case where a behavior designated at the element Ti is not present (step 420; N), the processing of the relationship model operation means 104 returns to step 405, and a similar processing is carried out for another element Ti.

In a case where a behavior designated at the element Ti is present (step 420; Y), the communication control means 103 carries out designated operations (step 425).

Next, the relationship model operation means 104 changes this element Ti to a normal topic mode, and also reflects this element Ti in the overall relationship model (step 430).

Thereafter, the relationship model operation means 104 repeats each of the steps from step 405 to step 430 until the set D becomes an empty set.

Next, a description is given of a personalization method employing relationship models.

Personalization is information processing suitable for individual users such as changing display content of a WEB page in accordance with an internal model possessed by an individual user.

In relationship models, various topics (topics) are stored in a form of topic nodes, with values for the topics as seen by the user being calculated according to resource utilization conditions.

It is possible to increase a value felt by the user with respect to provided products by showing products relating to information sensed as being of value to the user when a WEB server etc. administered by an enterprise presents WEB pages to a user.

For example, it is assumed that the user A obtains several photographs (image data) via a photographic community. It is assumed that the user A likes these pictures and looks at them many times using the image/moving image viewer 112 or sets them as a wallpaper. At this time, influence on the topic node given to the resource (image data) at this time is made higher).

Here, these photographs are assumed to be taken using a camera employing a certain digital system, and the user A is assumed to access the WEB site for digital cameras of the digital system.

At this time, the extent to which the user likes these digital cameras can be increased by displaying the photographs that the user likes on digital camera WEB pages the WEB site presents to the user.

A more specific description is now given of an example of displaying a photograph for which user evaluation is high on the WEB page. In this example, this function is implemented using, for example, a CGI (Common Gateway Interface).

This "CGI" is technology for implementing information processing that is more advanced than in a case of describing WEB pages using mark-up language such as simple HTML etc., that is implemented by embedding CGI scripts described using a computer language such as, for example, Perl, in the aforementioned WEB pages, with this CGI program then being executed by the server.

Because of this, in the current case, a server function for implementing CGI script is provided at the terminal 100.

Figure 24:
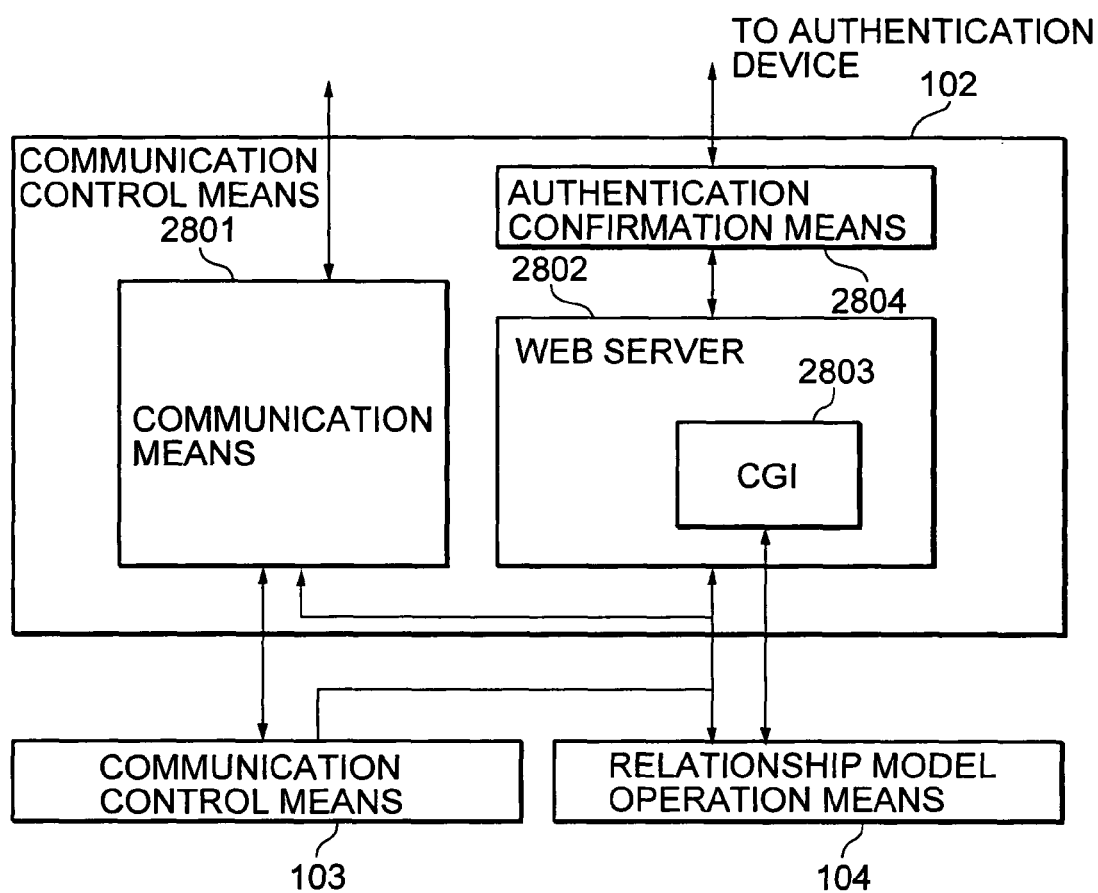
FIG. 24 is a view showing a configuration for communication control means.

FIG. 24 is a view showing a configuration for the communication control means 102 for the case where CGI is implemented at the terminal 100.

Communication means 2081 is a module for carrying out communication between the content server 200 and other servers, and carries out transmission and receive of files, etc.

A WEB server 2802 interprets HTML files (WEB page information) downloaded from the content server 200 and other servers by the communication means 2801. In this example, the WEB pages are assumed to be made using HTML files. These may also be made using other types of mark-up language.

A CGI 2083 is installed at the WEB server 2802 and interprets CGI scripts in the HTML files.

In a case where script denoting personalization is contained in the interpreted HTML file, the WEB server 2802 analyzes these using CGI 2803.

In this embodiment, the script is for extracting resources satisfying prescribed conditions using the relationship model, and presenting these by displaying in combination at the WEB pages.

The WEB server 2802 then builds prescribed resources into an HTML file in accordance with the CGI script in the HTML file to enable utilization by the browser 110.

The WEB server 2802 is therefore configured with incorporation means, and the browser 110 is configured with presentation means.

In a case of the resource being an image (image data), a query is sent to a specific port of the local host using an image tag expressing the displaying of the image in the HTML so as to enable implementation by acquiring the image data.

For example, a topic node referred to as "abc-P5" is set for image data taken using a digital camera of a model number abc-P5, and when the influence of this topic node is higher than average, a tag for displaying the image set at the link of this topic node can be described by the following.

<img src="http://localhost:80/scripts?type=imag&topic=abc-p5&effect=avg_high"/>

Authentication confirmation means 2804 is for obtaining permission for execution at an authentication device (installed, for example, on the server 200) (not shown) when the WEB server 2802 executes content instructed by the CGI script.

The HTML file containing this CGI script utilizes the users internal model (users individual information). This means that only a HTML file sent from the appropriate server is capable of using the users internal model, and misuse of the users personal information can therefore be prevented.

Figure 25:
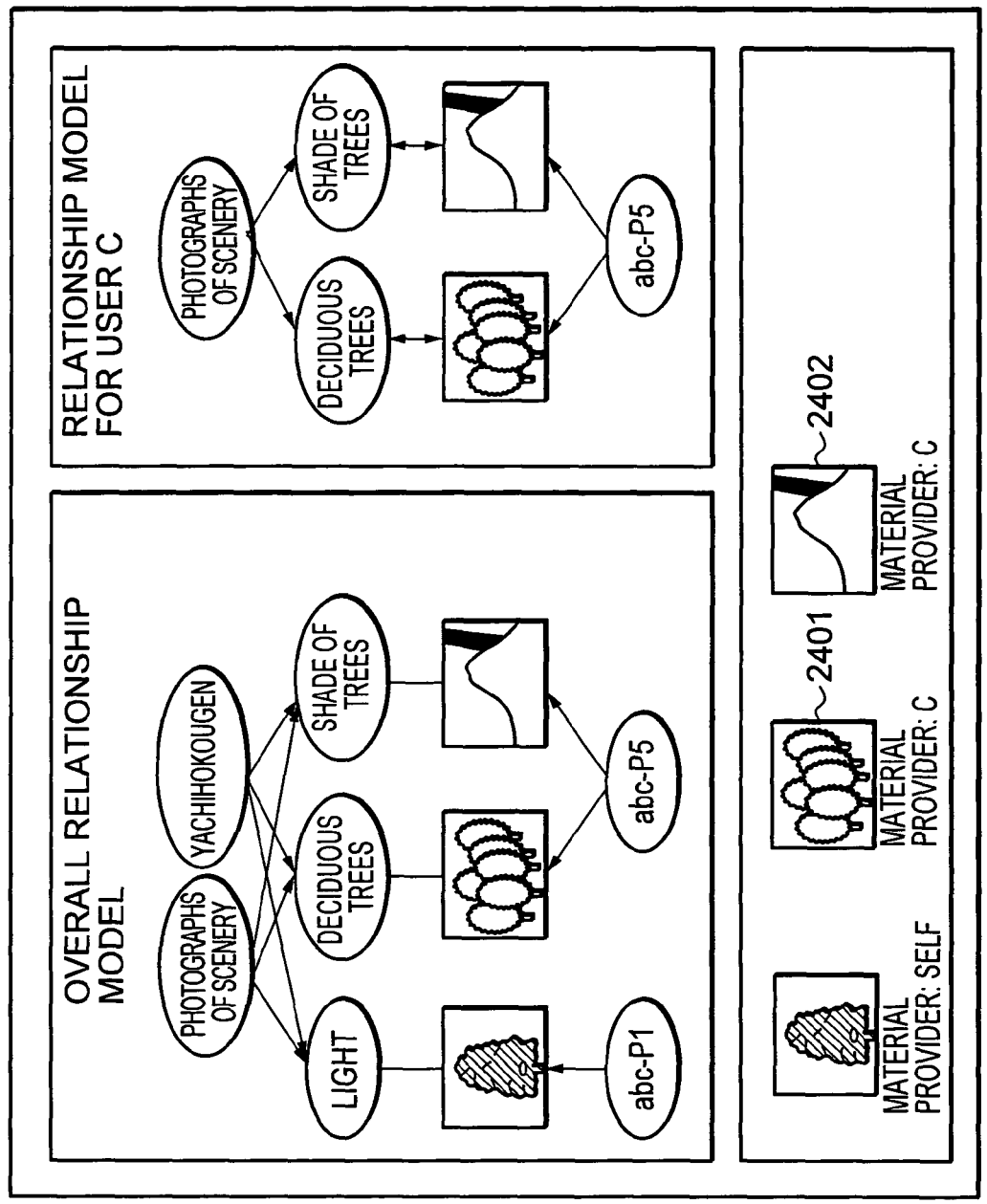
FIG. 25 is a view showing an example of an internal model.

It is also taken that the user has the internal model shown in FIG. 25. In a case where displaying of two images taken with the digital camera of the model number abc-P5 is designated using the aforementioned kind of tag, image data specified by the resource nodes 2401 and 2402 is acquired.

Figure 26:
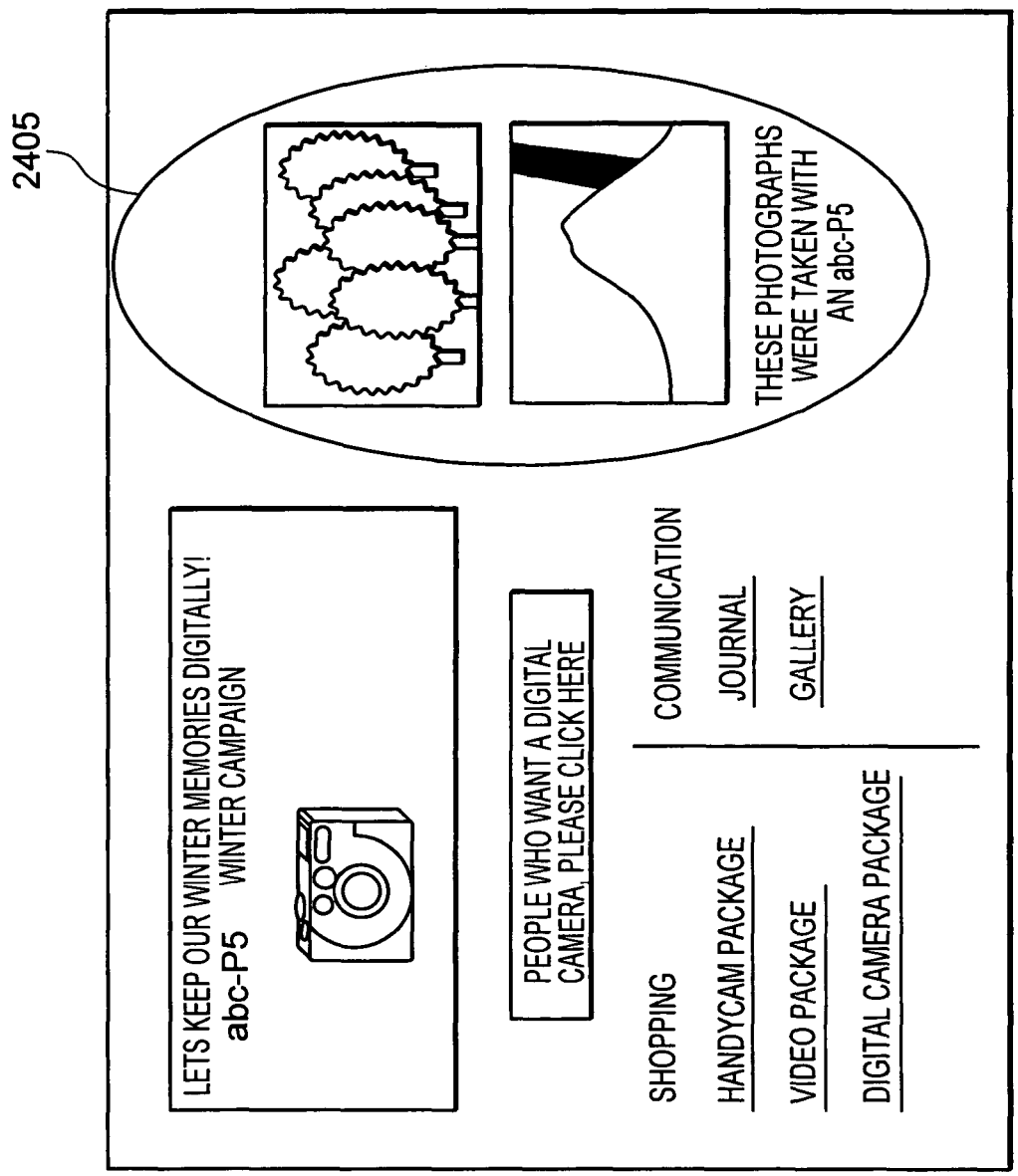
FIG. 26 is a view showing a WEB page in which image data are synthesized.

The browser 110 displays the images as shown in FIG. 26 where this image data is combined in the WEB page.

An image 2405 in FIG. 26 is embedded on the side of the terminal 100 in accordance with script contained in the HTML file distributed from the digital camera site etc. of the content server 200 so as to provide personalization.

In this example, when the WEB page for the digital camera is displayed, the image data highly evaluated by the user themselves and the model number of the digital camera that took this image data are displayed, and the users evaluation of the digital camera can therefore be increased.

Figure 27:
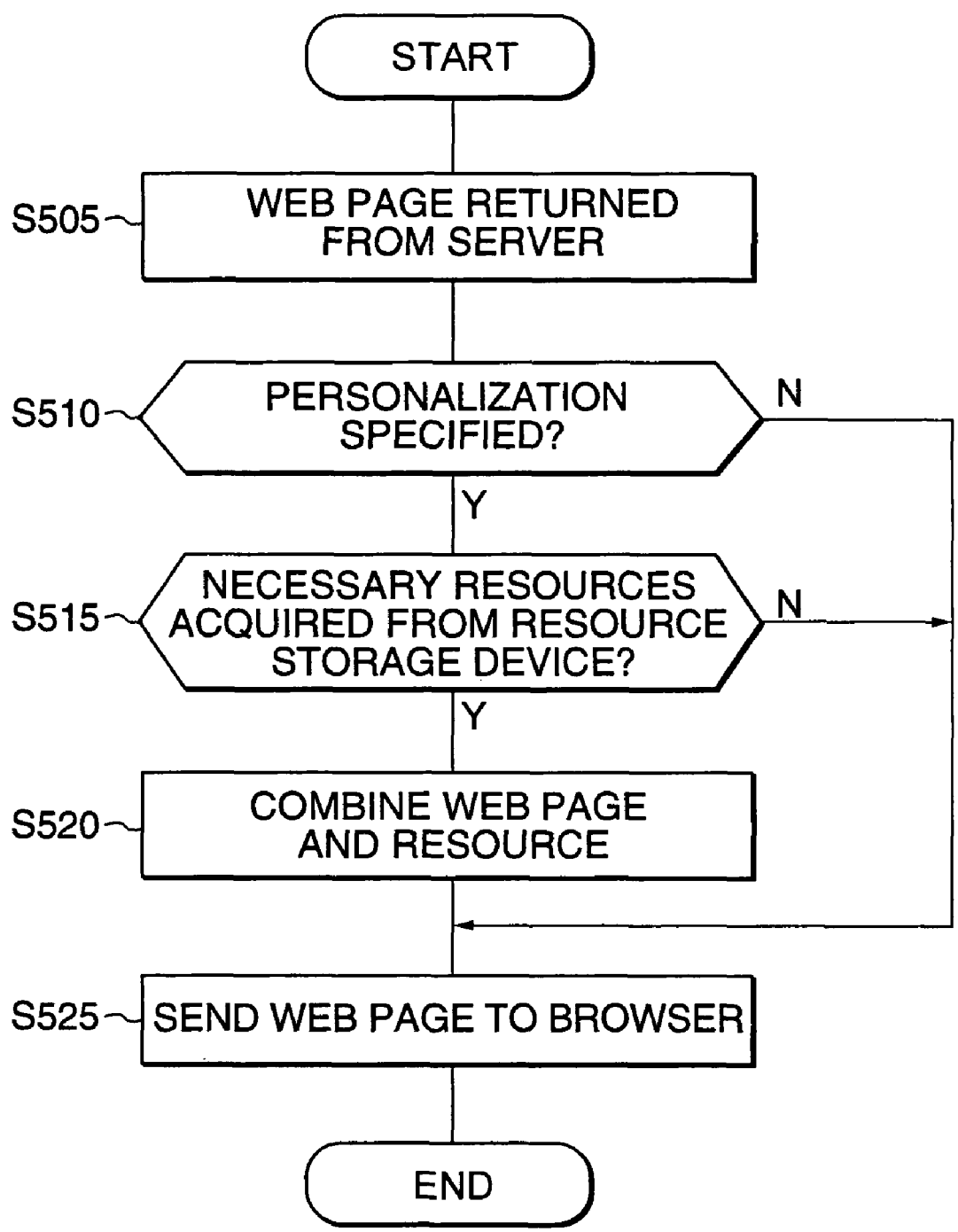
FIG. 27 is a flowchart illustrating steps in a case of personalizing a WEB page.

FIG. 27 is a flowchart illustrating order in a case of personalizing a WEB page.

First, when script is contained in a WEB page, the WEB server 2802 interprets this using the CGI 2803, and acquisition of resources satisfying prescribed conditions described in the script is returned to the relationship model operation means 104 (step 505).

When there is no personalization instruction in the WEB page (step 510; N), the communication control means 103 sends a WEB page to the browser 110 (step 525), and the processing ends.

Next, when there is a personalization instruction in the WEB page (step 510; Y), the relationship model operation means 104 attempts to acquire the necessary resources from the resource storage means 105 (step 515).

When the required resources cannot be acquired (step 515; N), the communication control means 103 sends a WEB page to the browser 110 (step 525) and the processing ends.

When the necessary resources cannot be acquired (step 515; Y), the communication control means 103 acquires the resources and passes them over to the WEB server 2082. The WEB server 2082 then combines the acquired resources and WEB page (step 520), sends these to the browser 110 (step 525), and processing is complete.

The resources possessed by the user can then be combined and presented at the WEB page by the browser 110.

Next, a description is given of visualizing of the relationship model.

In this embodiment, a description is given of a case of visualizing a relationship model taking similarity of interest and influence as axes in a two-dimensional plane, and a case of visualizing topics as axes of topic frequency and importance. These visualizations are carried out by the relationship model visualizing means 107 (relationship model analysis means 205 in the case of the content server 200).

The following takes the case of visualizing relationship models taking similarity of interest and influence as axes in a two-dimensional plane.

First, similarity for an overall relationship model for a specific relationship model Ri is defined using the following equation (1).

$$Sim(Ri) = \Sigma(Taj \times Trj) / \{\Sigma(Taj)^2 \times \Sigma(Trj)^2\}^{1/2} \quad \text{(Equation 1)}$$

Here, Taj and Trj represent relative influence of the overall relationship model and the specific relationship node respectively for the topic nodes. Here, relative influence is taken to be a value given by dividing the influence of each topic node by the total influence of each topic node within each model. Similarity is by no means limited to this equation, and a correlation coefficient relating to the influence of each topic node may also be taken as the similarity. At this time, equation (1) becomes the following equation (2). In this way, the relationship model visualizing means 107 constitutes similarity acquisition means.

$$Sim(Ri) = \Sigma\{(Taj\text{-}<Ta>) \times (Trj\text{-}<Tr>)/\{\Sigma(Taj\text{-}<Ta>)^2 \times \Sigma (Trj\text{-}<Tr>)^2\}^{1/2} \quad \text{(Equation 2)}$$

Here, $<Ta>$ and $<Tr>$ express an average of Taj and Trj, respectively.

Next, influence of each specific relationship model is calculated. Influence is calculated as the item, of the topic nodes contained in each specific relationship structure, for which influence is the largest for each specific relationship model, and influence on each specific relationship model Ri is defined by the following equation (3).

$$E(Ri) = \max[E(Tj) | Tj \in Ri] / \max[E(Tk) | Tk \in Rk, 0 < k < 1] \quad \text{(Equation 3)}$$

Where E(Tj) expresses the influence of topic node Tj. Further, it is taken that at least one specific relationship model exists within the internal model. The relationship model visualizing means 107 is configured from structure value acquisition means for acquiring influence of a specific relationship model (structure value for a specific relationship structure).

According to the above equations (1) to (3), influence and similarity calculated for each specific relationship target (the user B, the user C, etc.) is displayed in a two-dimensional plane. At this time, of icons expressing the targets of each specific relationship model and topic nodes utilized in calculation of influence, items for which the influence if in excess of a predetermined threshold value are displayed. This example is shown in FIG. 28.

Figure 28:
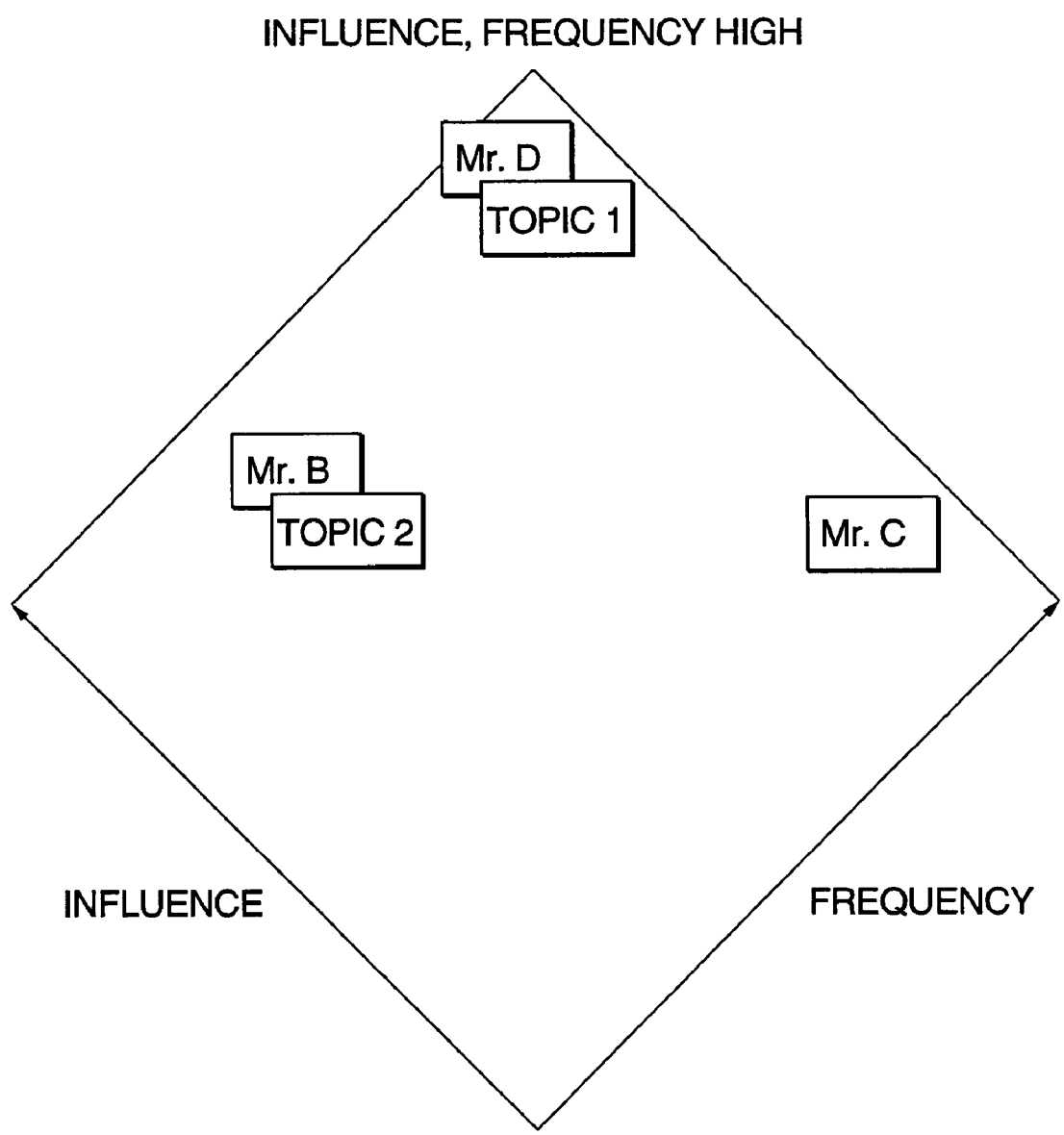
FIG. 28 shows where a relationship model is made visible.

As shown in FIG. 28, the similarity is high for the user C, but influence is not high. On the other hand, the influence of the user B is high but the similarity is not high. Further, it can be understood that the influence of the topic node for "topic 2" of the specific relationship model of the user B exceeds the threshold value.

Moreover, it can be understood that the specific relationship model for the user D is such that influence and similarity are high, and that a topic node for "topic 1" of the relationship model for user D exceeds a threshold value.

A large similarity between the specific relationship model and the overall relationship model means that the likes and interests of the user that is the target of the specific relationship model and the user in possession of this internal model are similar. This is because the overall relationship model is also a relationship model for the user in possession of the internal model.

Further, a large influence means that the number of times of utilization of resources relating to the specific relationship model is large, and the value with regards to the user is high.

Next, the following is performed in the case where topics are visualized by taking topic frequency and influence as axes.

In this example, value is visualized with respect to interest within oneself using influence and frequency of topic nodes. In order to carry out visualization, within the overall relationship model, relative frequency of each topic node is calculated using the following equation (4). Here, F(Tj) expresses the frequency of topic node Tj.

$$Tf(Tj)=F(Tj)/\Sigma F(Ti) \quad \text{(Equation 4)}$$

Similarly, the relative influence of each topic node is calculated using the following equation (5). Here, E(Tj) expresses influence of a topic node within the overall relationship model.

$$E(Tj)=E(Tj)/\max[E(Tj)|Tj \in A] \quad \text{(Equation 5)}$$

Next, language expressing each topic node is displayed at positions (Tf(Tj), E(Tj)) in a two-dimensional plane taking relative frequency and influence of topic nodes as axes, similarly to FIG. 28.

Now, a description is given for searching (browsing) information space using a relationship model. Here, information within information space is taken to hold topic structure expressing information content and relationship sets possessed by information as meta-information. The topic structure expressing content of information is meta-information equivalent to that assigned to information during information exchange. Searching of information space is carried out by the relationship model analysis means 205 but it is also possible for the relationship model visualizing means 107 to be given the similar function.

In a case where information within the information space is topic structure expressing information content, the following values are calculated for the search target in information space. First, a specific relationship model with the highest similarity with the topic structure possessed by the information is selected and the influence of this specific relationship model is calculated. Calculation of similarity employs equation (1), and calculation of influence employs equation (3). In this case, the relationship model analysis means 205 the similarity relationship structure acquisition means.

Next, similarity between a topic structure and an overall relationship model is calculated based on equation (1). Information which is wished to search for is then displayed in a two-dimensional plane based on this similarity and the influence that has just been calculated.

In a case where the information possesses a relationship set in the form of meta-information, at the relationship model, groups of specific relationship models for the same target are extracted (matching), similarity is calculated for the extracted individual specific relationship models and overall relationship models based on equation (1), and this average value is taken as the similarity. Next, the average value of influence is calculated for each topic within this specific relationship model set and is taken as influence with respect to the information.

The searched information is then displayed in a two-dimensional plane based on the similarity and influence as calculated above.

It is also possible to choose specific relationship models for utilization. In this case, at the relationship model visualizing means 107, only specific relationship models selected by the user are utilized, and a searchable information space is generated. More specifically, the user selects specific relationship models which is wished to utilize or not utilize in the configuring of search space from the specific relationship models displayed by relationship visualizing beforehand.

Next, a description is given of an example of displaying a relationship model at the display of a terminal 100.

Figure 29:
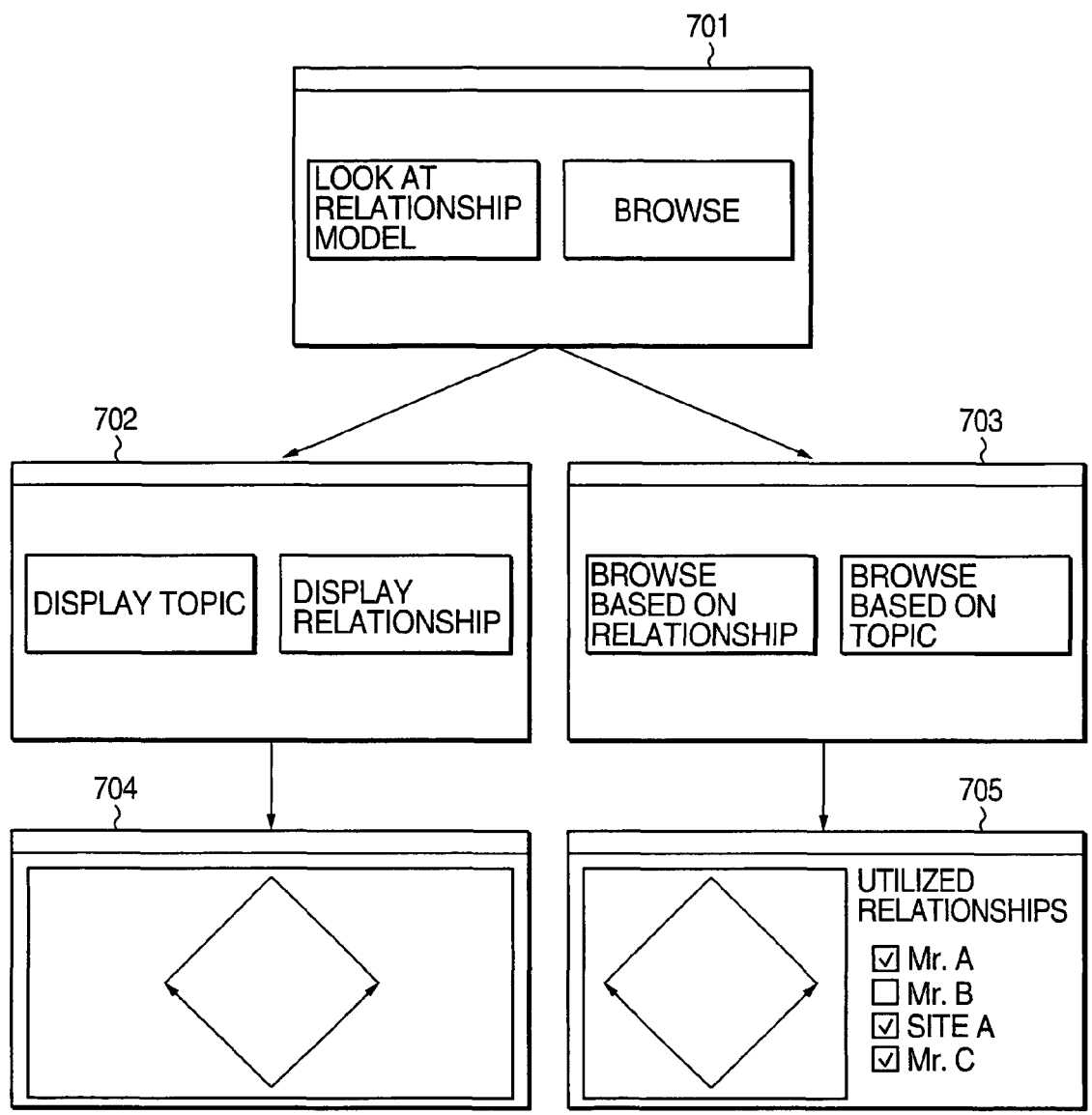
FIG. 29 is a view illustrating transition of a screen displayed at a display.

FIG. 29 is a view illustrating transition of a screen displayed at a display. It is possible to select "look at relationship model" or "browse" using a selection screen 701.

After "look at relationship model" is selected at the selection screen 701, a further selection screen 702 is displayed, and it is possible to select "display topic" or "display relationship". When either is selected using selection screen 702, displaying of the selected content takes place at a display screen 704.

After "browse" is selected using the selection screen 701, a further selection screen 703 is displayed, and it is possible to select "browse based on relationship" or browsed based on topic".

After either is selected using the selection screen 703, displaying of the selected content takes place at a display screen 705. At the display screen 705, a checkbox is provided for choosing relationship models for carrying out browsing, with relationship models that are checked being utilized in browsing. The display screen 705 constitutes choosing means.

Figure 30:
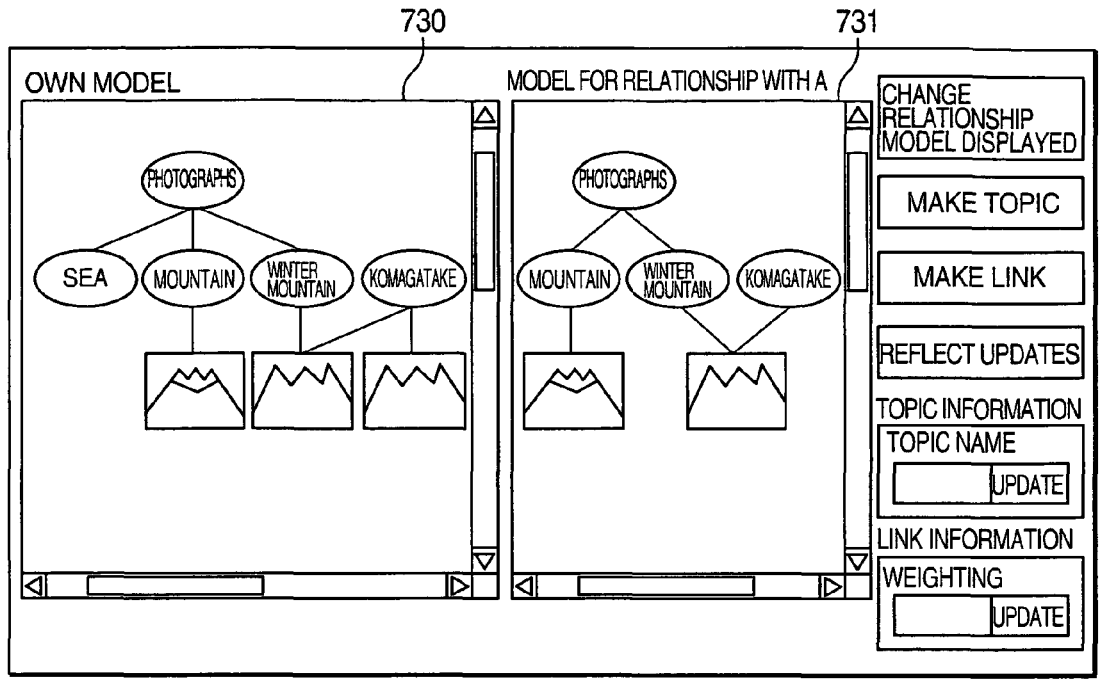
FIG. 30 is a view showing an example of a relationship model edit screen.

FIG. 30 is a view showing an example of a relationship model edit screen. Editing operations such as generation of topic nodes and setting of nodes etc. can be carried out using a relationship model editing screen.

Figure 31:
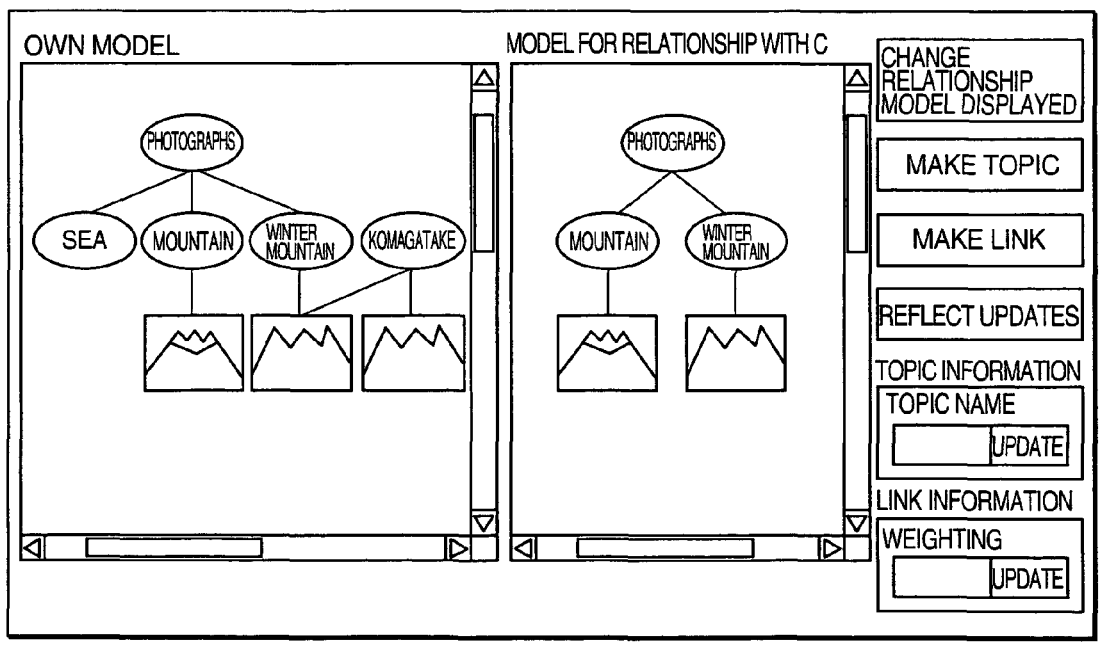
FIG. 31 is a view showing an example of a relationship model edit screen.

The overall relationship model can be displayed graphically at an own model display area 730. Selected specific relationship models can also be displayed graphically at a specific relationship model display area 731. A relationship model for the user A is displayed in the drawings. It is possible to select which user a relationship model is displayed for by operating a "change relationship model displayed" button. In a case where a relationship model is selected for the user C, as shown in FIG. 31, a relationship model can be displayed for the user C.

In a case where a "make topic" button is clicked, a topic node is made at the specific relationship model display area 731, and a corresponding topic node is also made at the overall relationship model display area 730.

In a case where a "make link" button is clicked after selecting two topic nodes using the specific relationship model display area 731, these two topic nodes are connected by a link. A corresponding topic node is also connected by linking at the overall relationship model display area 730.

In a case where a "reflect updates" button is clicked, the relationship model updates the edited content.

After a topic node is selected at the specific relationship model display area 731, if a topic name is inputted using "topic information" and the "update" button is selected, the topic name is updated to the inputted topic name for the topic node. The topic name of the corresponding topic node of the overall relationship model display area 730 is also similarly updated.

After a link is selected using the specific relationship model display area 731, if a weighting is inputted using "link information" and the "update" button is selected, the weighting is updated to the inputted weighting. The weighting of the corresponding link of the overall relationship model display area 730 is also similarly updated.

In the embodiment described above, the following effects can be obtained.

(1) By using information pushing technology, it is possible to distribute information at a time when a user feels value so as to enable more effective information distribution.

(2) By using personalization technology for WEB pages at a WEB site, it is possible to present information in a manner where a user feels value based on an internal model possessed by the user, and it is possible to evoke a feeling of value for the information wished to be presented by an administrator of a website in a user.

(3) By visualizing information structures, it is possible for a user to understand their own experiences on a network (for example, information received from user B was high in value, but information received from user C was not so high in value) based on relationships, so that more effective communication is possible by carrying out communication based on relationships.

(4) By visualizing information structures it is possible to visualize the value possessed by a community or to visualize information provided by contributors to a community. As a result, it is possible for an enterprise to determine whether or not a community is an appropriate community with which to do business.

(5) Regarding searching of information space, by configuring searched space using value with respect to relationships and topics possessed by users, it is possible for a user to easily recall the value of a target so as to enable effective information searching.

In the above, a description is given of an embodiment of the present invention, but the present invention is by no means limited to the embodiment described, and various modifications are possible within the scope of the present invention as laid out in the patent claims.

According to the present invention, it is possible to handle changes occurring in the value of information dynamically.

The invention claimed is:

1. A computer-implemented method performed by a first terminal for managing media resources, comprising:
   receiving, from a second terminal, a first relationship model associated with a user of the second terminal and describing hierarchically the content of a media resource, the first relationship model including:
      first topic nodes corresponding to first keywords describing the content of the media resource,
      a first resource node identifying the media resource, and
      first links connecting the first topic nodes and the first resource node;
   accessing a stored second relationship model describing hierarchically the content of a media resource associated with a user of the first terminal, the second relationship model including:
      second topic nodes corresponding to second keywords describing the content of the media resource,
      a second resource node identifying the media resource, and
      second links connecting the second topic nodes and the second resource node;
   determining whether the first relationship model contains a topic node or a resource node that is different from the second relationship model, based on whether a keyword of the first keywords is different from the second keywords; and
   when it is determined that the first relationship model contains the different node, updating the second relationship model to include the different node.

2. The method of claim 1, wherein the updating comprises:
   adding the different node to the second relationship model; and
   linking the different node to other nodes in the second relationship model.

3. The method of claim 1, wherein the second relationship model further includes weightings assigned to the second links, the weightings indicating values of the second topic nodes connected by the second links in leading the user of the first device to access the media resource.

4. The method of claim 3, further comprising, when it is determined that the first relationship model contains no node different from the second relationship model, increasing the weightings of the links between the second resource node and the second topic nodes in the second relationship model corresponding to the first resource node and the first topic nodes in the first relationship model.

5. The method of claim 3, further comprising:
   receiving a request from the user of the first device to access the media resource; and
   increasing the weightings of links between the second resource node and the second topic nodes in the second relationship model corresponding to the requested resource.

6. The method of claim 3, further comprising automatically performing a predetermined action in response to the weightings increasing such that the values of the second topic nodes exceed a threshold.

7. The method of claim 6, wherein the predetermined action includes pushing information to at least one of the first and second terminals.

8. The method of claim 1, further comprising:
   computing a similarity between the first relationship model and the second relationship model; and
   pushing information to one of the first and second terminals when the computed similarity is greater than a predetermined threshold.

9. A computer-implemented method performed by a first terminal for managing media resources, comprising:
   receiving a selection of a media resource to be transmitted to a second terminal;
   accessing a stored first relationship model associated with the user of the first terminal and describing hierarchically the content of the media resource, the first relationship model including:
      first topic nodes corresponding to first keywords describing the content of the media resource,
      a first resource node identifying the media resource, and
      first links connecting the first topic nodes and the first resource node;
   accessing a stored second relationship model associated with a user of the second terminal and describing hierarchically the content of the media resource, the second relationship model including:
      second topic nodes corresponding to second keywords describing the content of the media resource,
      a second resource node identifying the media resource, and
      second links connecting the second topic nodes and the second resource node;
   determining whether the first relationship model contains a topic node that is different from the second relationship model, based on whether a keyword of the first keywords is different from the second keywords; and when it is determined that the first relationship model contains the different topic node:
  updating the second relationship model to include the different topic node; and
  transmitting to the second terminal the selected media resource and the updated second relationship model.

10. The method of claim 9, wherein the updating comprises:
  adding the different topic node corresponding to the different keyword to the second relationship model; and
  linking the added topic node to other nodes in the second relationship model.

11. The method of claim 9, wherein the first and second relationship models further include respective weightings assigned to the first and second links, the weightings respectively indicating the values of the first and second topic nodes connected by the first and second links in leading the users of the first and second terminals to access the media resource.

12. The method of claim 11, further comprising, when it is determined that the first relationship model contains no topic node different from the second relationship model, increasing the weightings of links between the resource node and the topic nodes in at least one of the first and second relationship models.

13. The method of claim 11, further comprising increasing the weightings of links between the resource node and the topic nodes in at least one of the first and second relationship models in response to the request.

14. The method of claim 11, further comprising automatically performing a predetermined action in response to the weightings increasing such that the values of the topic nodes exceed a threshold.

15. The method of claim 14, wherein the predetermined action includes pushing information to at least one of the first and second terminals.

16. The method of claim 9, further comprising:
  computing a similarity between the first relationship model and the second relationship model; and
  pushing information to at least one of the first and second terminals when the computed similarity is greater than a predetermined threshold.

17. A computer-readable storage medium storing a computer program that, when executed by a first terminal, causes the first terminal to perform a method for managing media resources, the method comprising:
  receiving, from a second terminal, a first relationship model associated with a user of the second terminal and describing hierarchically the content of a media resource, the first relationship model including:
    first topic nodes corresponding to first keywords describing the content of the media resource,
    a first resource node identifying the media resource, and
    first links connecting the first topic nodes and the first resource node;
  accessing a stored second relationship model describing hierarchically the content of a media resource associated with a user of the first terminal, the second relationship model including:
    second topic nodes corresponding to second keywords describing the content of the media resource,
    a second resource node identifying the media resource, and
    second links connecting the second topic nodes and the second resource node;
  determining whether the first relationship model contains a topic node or a resource node that is different from the second relationship model, based on whether a keyword of the first keywords is different from the second keywords; and
  when it is determined that the first relationship model contains the different node, updating the second relationship model to include the different node.

18. The computer-readable storage medium of claim 17, wherein the updating comprises:
  adding the different node to the second relationship model; and
  linking the different node to other nodes in the second relationship model.

19. The computer-readable storage medium of claim 17, wherein the second relationship model further includes weightings assigned to the second links, the weightings indicating values of the second topic nodes connected by the second links in leading the user of the first device to access the media resource.

20. The computer-readable storage medium of claim 19, the method further comprising, when it is determined that the first relationship model contains no node different from the second relationship model, increasing the weightings of the links between the second resource node and the second topic nodes in the second relationship model corresponding to the first resource node and the first topic nodes in the first relationship model.

21. The computer-readable storage medium of claim 19, the method further comprising:
  receiving a request from the user of the first device to access the media resource; and
  increasing the weightings of links between the second resource node and the second topic nodes in the second relationship model corresponding to the requested resource.

22. The computer-readable storage medium of claim 19, the method further comprising automatically performing a predetermined action in response to the weightings increasing such that the values of the second topic nodes exceed a threshold.

23. The computer-readable storage medium of claim 22, wherein the predetermined action includes pushing information to at least one of the first and second terminals.

24. The computer-readable storage medium of claim 17, the method further comprising:
  computing a similarity between the first relationship model and the second relationship model; and
  pushing information to one of the first and second terminals when the computed similarity is greater than a predetermined threshold.

25. A computer-readable storage medium storing a computer program that, when executed by a first terminal, causes the first terminal to perform a method for managing media resources, the method comprising:
  receiving a selection of a media resource to be transmitted to a second terminal;
  accessing a stored first relationship model associated with the user of the first terminal and describing hierarchically the content of the media resource, the first relationship model including:
    first topic nodes corresponding to first keywords describing the content of the media resource,
    a first resource node identifying the media resource, and
    second links connecting the first topic nodes and the first resource node;
  accessing a stored second relationship model associated with a user of the second terminal and describing hierarchically the content of the media resource, the second relationship model including:
  second topic nodes corresponding to second keywords describing the content of the media resource,
  a second resource node identifying the media resource, and
  second links connecting the second topic nodes and the second resource node;
determining whether the first relationship model contains a topic node that is different from the second relationship model, based on whether a keyword of the first keywords is different from the second keywords; and
when it is determined that the first relationship model contains the different topic node:
  updating the second relationship model to include the determined different topic node; and
  transmitting to the second terminal the selected media resource and the updated second relationship model.

26. The computer-readable storage medium of claim 25, wherein the updating comprises:
  adding the different topic node corresponding to the different keyword to the second relationship model; and
  linking the added topic node to other nodes in the second relationship model.

27. The computer-readable storage medium of claim 25, wherein the first and second relationship models further include respective weightings assigned to the first and second links, the weightings respectively indicating values of the first and second topic nodes connected by the first and second links in leading the users of the first and second terminals to access the media resource.

28. The computer-readable medium of claim 27, the method further comprising, when it is determined that the first relationship model contains no topic node different from the second relationship model, increasing the weightings of links between the resource node and the topic nodes in at least one of the first and second relationship models.

29. The computer-readable medium of claim 27, the method further comprising increasing the weightings of links between the resource node and the topic nodes in at least one of the first and second relationship models in response to the request.

30. The computer-readable storage medium of claim 27, the method further comprising automatically performing a predetermined action in response to the weightings increasing such that the values of the topic nodes exceed a threshold.

31. The computer-readable storage medium of claim 30, wherein the predetermined action includes pushing information to at least one of the first and second terminals.

32. The computer-readable storage medium of claim 25, the method further comprising:
  computing a similarity between the first relationship model and the second relationship model; and
  pushing information to at least one of the first and second terminals when the computed similarity is greater than a predetermined threshold.

33. A first information processing apparatus, comprising:
  a memory storing a first relationship model describing hierarchically the content of a media resource associated with a user of the first information processing apparatus and, the first relationship model including:
    first topic nodes corresponding to first keywords describing the content of the media resource,
    a first resource node identifying the media resource, and
    first links connecting the first topic nodes and the first resource node; and
  a processor configured to:
    receive, from a second terminal, a second relationship model associated with a user of the second terminal and describing hierarchically the content of the media resource, the second relationship model including:
      second topic nodes corresponding to second keywords describing the content of the media resource,
      a second resource node identifying the media resource, and
      second links connecting the second topic nodes and the second resource node;
    determine whether the second relationship model contains a topic node or a resource node that is different from the first relationship model, based on whether a keyword of the second keywords is different from the first keywords; and
    when it is determined that the second relationship model contains the different node, updating the first relationship model to include the different node.

* * * * *